(12) United States Patent
Sumiyama et al.

(10) Patent No.: US 7,775,684 B2
(45) Date of Patent: Aug. 17, 2010

(54) WAVELENGTH SELECTIVE ELEMENT, MANUFACTURING APPARATUS FOR MANUFACTURING WAVELENGTH SELECTIVE ELEMENT, MANUFACTURING METHOD FOR MANUFACTURING WAVELENGTH SELECTIVE ELEMENT, LIGHT SOURCE DEVICE, IMAGE DISPLAY DEVICE, AND MONITOR

(75) Inventors: Fumika Sumiyama, Matsumoto (JP); Shunji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 12/007,569

(22) Filed: Jan. 11, 2008

(65) Prior Publication Data

US 2008/0174873 A1    Jul. 24, 2008

(30) Foreign Application Priority Data

Jan. 18, 2007  (JP)  ............... 2007-009016
Nov. 28, 2007  (JP)  ............... 2007-307605

(51) Int. Cl.
*F21V 9/00*  (2006.01)
*G02B 27/20*  (2006.01)
*G02B 5/32*  (2006.01)

(52) U.S. Cl. ............... 362/293; 362/259; 359/15
(58) Field of Classification Search ............ 362/293, 362/553, 259, 235; 353/84; 359/15, 22, 359/24, 589, 634
See application file for complete search history.

(56) References Cited

U.S. PATENT DOCUMENTS

| 5,193,023 | A | | 3/1993 | Yamada et al. |
|---|---|---|---|---|
| 5,526,145 | A | * | 6/1996 | Weber ............... 359/15 |
| 5,892,597 | A | | 4/1999 | Iwata et al. |
| 6,127,066 | A | * | 10/2000 | Ueda et al. ............... 430/1 |
| 6,192,170 | B1 | | 2/2001 | Komatsu |
| 6,256,123 | B1 | * | 7/2001 | Hazama ............... 359/25 |
| 6,975,294 | B2 | | 12/2005 | Manni et al. |
| 2002/0012377 | A1 | | 1/2002 | Suganuma et al. |
| 2006/0023173 | A1 | | 2/2006 | Mooradian et al. |

(Continued)

FOREIGN PATENT DOCUMENTS

JP    A-04-19719    1/1992

(Continued)

OTHER PUBLICATIONS

Machine translation of JP 2003-114322.*

(Continued)

*Primary Examiner*—Jong-Suk (James) Lee
*Assistant Examiner*—David R Crowe
(74) *Attorney, Agent, or Firm*—Oliff & Berridge, PLC

(57) ABSTRACT

A wavelength selective element includes: a base member; light selective regions formed in the base member, in which a predetermined selective wavelength is selected from the laser light emitted from a plurality of light emission elements that emit the laser light; and interference regions, each of which is provided in one of the light selective regions, each of which includes interference fringes having streaks, and including at least a first interference region and a second interference region in which a first distance between streaks of the interference fringes of the first interference region is different from a second distance between streaks of the interference fringes of the second interference region.

8 Claims, 20 Drawing Sheets

U.S. PATENT DOCUMENTS

| | | |
|---|---|---|
| 2006/0023757 A1 | 2/2006 | Mooradian et al. |
| 2006/0268241 A1 | 11/2006 | Watson et al. |
| 2006/0280219 A1 | 12/2006 | Shchegrov |
| 2007/0153862 A1 | 7/2007 | Shchegrov et al. |
| 2007/0153866 A1 | 7/2007 | Shchegrov et al. |

FOREIGN PATENT DOCUMENTS

| | | | |
|---|---|---|---|
| JP | A-05-072959 | | 3/1993 |
| JP | 10048422 A | * | 2/1998 |
| JP | A-2000-174397 | | 6/2000 |
| JP | A-2001-284718 | | 10/2001 |
| JP | 2003114321 A | * | 4/2003 |
| JP | 2003114322 A | * | 4/2003 |
| JP | A-2004-503923 | | 2/2004 |

OTHER PUBLICATIONS

Mooradian, Aram et al. "High Power Extended Vertical Cavity Surface Emitting Diode Lasers and Arrays and their Applications." Micro-Optics Conference, Tokyo, Nov. 2, 2005. pp. 1-4.

"Volume Holographic Gratings (VHG)." Ondax, Inc., 2005, P:626.357.9600, pp. 1-7.

* cited by examiner

A a B b C c D d

A(a) B(b) C(c) D(d) E(e)

WAVELENGTH SELECTIVE ELEMENT, MANUFACTURING APPARATUS FOR MANUFACTURING WAVELENGTH SELECTIVE ELEMENT, MANUFACTURING METHOD FOR MANUFACTURING WAVELENGTH SELECTIVE ELEMENT, LIGHT SOURCE DEVICE, IMAGE DISPLAY DEVICE, AND MONITOR

CROSS-REFERENCE TO RELATED APPLICATION

This application claims priority from Japanese Patent Application No. 2007-009016, filed on Jan. 18, 2007, and Japanese Patent Application No. 2007-307605, filed on Nov. 28, 2007, the contents of which are incorporated herein by reference.

BACKGROUND

1. Technical Field

The present invention relates to a wavelength selective element, a manufacturing apparatus for manufacturing a wavelength selective element, a manufacturing method for manufacturing a wavelength selective element, a light source device, an image display device, and a monitor.

2. Related Art

Discharge lamps such as era-high pressure mercury lamps are generally used as light sources in projection type image display device in recent years.

However, in such a discharge lamp, there are problems in that the service lifetime is comparatively short, instantaneous lighting is difficult, the color reproducibility range is narrow, and the ultraviolet rays emitted from the lamp may degrade the liquid crystal light valve.

As an alternative to this discharge lamp, a projection type image display device using a laser light source emitting monochromatic light is proposed here.

However, while a laser light source does not have the problems mentioned above, the laser light source has the disadvantage that it has coherence.

As a result, interference fringes appear as speckle noise on the projection surface on which the laser light is projected and the image deteriorates. Thus, measures against speckle noise are necessary if highly accurate images are to be displayed.

For instance, measures against speckle noise are proposed in Published Japanese Translation No. 2004-503923 of PCT International Publication and Japanese Unexamined Patent Application, First Publication No. 2001-284718.

A light source provided with a plurality of emitters having differing central wavelengths is proposed as a device to eliminate speckle noise stated in the Published Japanese Translation No. 2004-503923 of PCT International Publication.

The bandwidth of the laser light emitted from this light source increases compared to light source with a plurality of single central wavelengths. Thus, in this manner, the speckle of the displayed image is reduced.

The external resonance type laser mentioned in Japanese Unexamined Patent Application, First Publication No. 2001-284718 is provided with a laser oscillator that oscillates laser light, and a reflective photopolymer volume hologram that reflects only the laser light of the predetermined wavelength from the laser light oscillated from the laser oscillator to the laser oscillator.

In this way, by using the volume hologram as an external resonator mirror, the width of the selected wavelength is reduced. Therefore, the coherence length of the laser light increases.

When the light is amplified by using a resonator mirror, however, problem arises in the technology mentioned in the Published Japanese Translation No. 2004-503923 of PCT International Publication since the spectral width of the laser light emitted from the light source is large and the resonator mirror has a narrow bandwidth Thus, the light emitted from the light source cannot resonate.

Also, since a volume hologram is used as the resonator mirror in the external resonance type laser mentioned in the Japanese Unexamined Patent Application, First Publication No. 2001-284718, wavelength selectivity is improved.

However, even if a light source emitting a plurality of rays of laser light is used, a single wavelength will be selected, and the speckle noise of the laser light emitted from light source including wavelength selective element cannot be suppressed.

SUMMARY

An advantage of some aspects of the invention is to provide a wavelength selective element, a manufacturing apparatus for manufacturing a wavelength selective element, a manufacturing method for manufacturing a wavelength selective element, a light source device, an image display device, and a monitor, in which it is possible to reduce the coherence of laser lights and to suppress speckle noise with a simple configuration.

A first aspect of the invention provides a wavelength selective element including: a base member; light selective regions formed in the base member, in which a predetermined selective wavelength is selected from the laser light emitted from a plurality of light emission elements that emit the laser light; and interference regions, each of which is provided in one of the light selective regions, each of which includes interference fringes having streaks, and including at least a first interference region and a second interference region in which a first distance between streaks of the interference fringes of the first interference region is different from a second distance between streaks of the interference fringes of the second interference region.

In the wavelength selective element of the first aspect of the invention, the interference regions on which interference fringes are formed is provided in the light selective regions, respectively. Also, the first distance between streaks of the interference fringes in the first interference region is different from the second distance between streaks of the interference fringes in the second interference region.

When this wavelength selective element is used in a light source device to emit light onto each interference region, the selective wavelength in each interference region can be varied with a high level of precision. As a result, the speckle noise of light emitted from the light source device can be suppressed.

It is preferable that, in the wavelength selective element of the first aspect of the invention various interference fringes having the streaks whose distances are different from each other be formed in the boundary portion of the interference regions.

Conventionally, when a wavelength selective element is used in the light source device to emit light emitted from a light emission section onto each interference region of the wavelength selective element, there is a problem in that it is difficult to align the light emission section with the wavelength selective element. Therefore, in order to lead the light emitted from the light emission section to be incident onto the wavelength selective element, it is necessary to align the light emission section with the wavelength selective element with a high level of precision.

In contrast, in the wavelength selective element of the first aspect of the invention, the various interference fringes having streaks whose distances are different from each other are formed in the boundary portion of the interference regions.

In an alignment process for aligning the light emission section with the wavelength selective element of the invention, when the light emission section is not aligned with the wavelength selective element, the output intensity of light emitted from the wavelength selective element is abruptly reduced because light is incident onto the boundary portion within the interference region.

As a result, misalignment thereof is easily determined, and it is possible to adjust the alignment between the light emission section and the wavelength selective element so that the light emitted from the light emission section is incident onto a desired position.

It is preferable that, in the wavelength selective element of the first aspect of the invention, the shapes of the interference regions be identical.

In the wavelength selective element of the first aspect of the invention, since the shapes of the interference regions in the wavelength selective element are identical, the interference region can be easily formed.

It is preferable that, in the wavelength selective element of the first aspect of the invention, two adjacent interference regions be overlapped each other.

As described above, conventionally, there is a problem in that it is difficult to align the light emission section with the wavelength selective element. Therefore, in order to lead the light emitted from the light emission section to be incident onto the wavelength selective element, it is necessary to align the light emission section with the wavelength selective element with a high level of precision.

In contrast, in the wavelength selective element of the first aspect of the invention, the two adjacent interference regions in the wavelength selective element are overlapped each other.

In an alignment process for aligning the light emission section with the wavelength selective element of the invention, when the light emission section is not aligned with the wavelength selective element, the output intensity of light emitted from the wavelength selective element is abruptly reduced because light is incident onto the region on which the interference regions are overlapped each other.

As a result, misalignment thereof is easily determined, and it is possible to adjust the alignment between the light emission section and the wavelength selective element so that the light emitted from the light emission section is incident onto a desired position.

On the other hand, conventionally, in the case in which the light emission section has a plurality of light emission elements emitting light and the distance between the light emission elements is small, there is a problem in that it is difficult to obtain a large selectable interference region at a predetermined selective wavelength.

In contrast, since the wavelength selective element of the invention has the interference regions which are overlapped each other, size of the selectable interference region can be adjusted at the predetermined selective wavelength.

Consequently, since the size of the selectable region can be increased at the predetermined selective wavelength, a wavelength selective element having an interference region suitable for light emission section with a narrow distance between the light emission elements can be offered.

It is preferable that, in the wavelength selective element of the first aspect of the invention, the interference regions be arrayed in a two-dimensional arrangement.

In the wavelength selective element of the first aspect of the invention, since the interference regions are arrayed in a two-dimensional arrangement, for example, when the light emission elements of the light emission section are arrayed in a two-dimensional arrangement, the wavelength selective element of the invention can be applied.

Compared to the wavelength selective element in which the interference regions are arranged in a one-dimensional arrangement, in the wavelength selective element in which the interference regions are arranged in the two-dimensional arrangement, that is, in the case in which the wavelength selective element of the invention including the interference regions arranged in two lines is applied to a light source device, the device can be miniaturized.

It is preferable that, in the wavelength selective element of the first aspect of the invention, a cross-sectional area of the interference regions in a direction perpendicular to the thickness direction of the base member increase gradually or step-by-step in the thickness direction.

In the wavelength selective element of the first aspect of the invention, the wavelength selective element has a cross-sectional area of the interference regions in a direction perpendicular to the thickness direction of the base member with a shape that increases gradually or step-by-step in the thickness direction. Therefore, when the light emitted from the light emission section is incident onto an outer region from the interference region, the light selection efficiency degrades abruptly, and the misalignment between the light emission section and the wavelength selective element can be easily determined.

Moreover, the light transmitting the inside of wavelength selective element slightly spreads. Therefore, for example, by forming the interference region so as to cause the cross-sectional area of the emission side of the base member to be greater than the cross-sectional area of the incidence side, light is emitted so as to prevent light being incident onto an outer region from the interference region.

As a result, the light utilization efficiency of light which is incident onto the wavelength selective element can be improved.

It is preferable that, in the wavelength selective element of the first aspect of the invention, two adjacent interference regions be formed so that the two adjacent interference regions are separated from each other by a predetermined distance.

In the wavelength selective element of the first aspect of the invention, the two adjacent interference regions are formed so that the two adjacent interference regions are separated from each other by a predetermined distance. Therefore, when the light is incident onto an outer region from the interference region, the output intensity of light decreases.

As a result, when aligning the light emission section with the wavelength selective element, the light emission section and the wavelength selective element can be correctly aligned. Thus, light can be accurately incident onto the interference regions.

A second aspect of the invention provides a manufacturing apparatus for manufacturing a wavelength selective element including light selective regions which include at least first light selective region and second light selective region, which are formed in a base member, and in which a predetermined selective wavelength is selected from the laser light emitted from a plurality of light emitting elements, the manufacturing apparatus including: a light source that emits two exposure beams toward the light selective regions of the base member; and an incidence angle adjusting section that adjusts the incidence angle at which at least one of the two exposure beams is incident onto the light selective regions, and adjusts the two exposure beams so that the angle between the two exposure beams being incident onto the first light selective region is different from the angle between the two exposure beams being incident onto the second light selective region.

In the manufacturing apparatus of the second aspect of the invention, the light source emits the two exposure beams toward the base member. Also, the incidence angle, at which at least one of the exposure beams is incident onto the light selective region, is adjusted by the incidence angle adjusting section. Specifically, the two exposure beams are adjusted so that the angle between the two exposure beams being incident onto the first light selective region is different from the angle between the two exposure beams being incident onto the second light selective region.

In this manner, by adjusting the angle made by the two exposure beams, the distance between streaks of the interference fringes formed in the light selective region of the base member can be varied.

Accordingly, since it is possible to adjust the incidence angle of exposure beam so that a predetermined selective wavelength is selected in each light selective region, a selective wavelength can be varied with a high level of precision for each light selective region on one base member with a simple configuration.

It is preferable that the manufacturing apparatus of the second aspect of the invention further include a mask having an opening corresponding to the light selective region onto which the exposure beam is incident.

In the manufacturing apparatus of the second aspect of the invention, the mask having an opening corresponding to the light selective region is provided in the manufacturing apparatus. Therefore, the light selective region onto which the exposure beam is not incident is screened.

Accordingly, the exposure beam is rayed only onto the predetermined light selective region on which the exposure beam is incident. Therefore, the exposure beam will not be incident onto other light selective regions.

Consequently, the selective wavelength in each light selective region on one base member can be varied with a high level of precision.

It is preferable that the manufacturing apparatus of the second aspect of the invention further include a condensing element condensing the exposure beam.

In the manufacturing apparatus of the second aspect of the invention, the condensing element condenses the exposure beam into the inside of each light selective region. Thus, it is possible to prevent the exposure beam from spreading to other light selective regions.

Consequently, the selective wavelength of light selected for each light selective region on one base member can be varied with a high level of precision because the interference fringe is prevented from mixing with the adjacent light selective regions.

Moreover, the incidence angle of the exposure beam incident onto each light selective region can be easily optimized since a condensing element with curvature that gives the predetermined incidence angle may be used.

It is preferable that the manufacturing apparatus of the second aspect of the invention further include a mask having openings corresponding to the light selective regions onto which the exposure beam are incident, respectively. In the manufacturing apparatus, the condensing elements are provided in the openings, respectively, the curvature of condensing elements is different from each other, and the condensing elements function as the incidence angle adjusting section.

In the manufacturing apparatus of the second aspect of the invention, the exposure beams is condensed into each light selective region by each condensing element. Each condensing element has a curvature that differs from that of other condensing element in each light selective region of the base member.

As a result, the exposure beam is prevented from spreading to other light selective region since the exposure beam is condensed into the inside of each light selective region.

That is, the condensing elements functions as an incidence angle adjusting section. Therefore, even if an exposure beam is led to be incident onto the condensing elements from identical direction, the diffraction angle of the exposure beam within the base member varies according to the light selective region because of the difference in curvature.

Accordingly, when a mask formed by openings corresponding to only the predetermined light selective region is used, alignment of the mask and the base member is necessary. However, in the invention, since it is adequate to lead the exposure beam to be incident onto each condenser lens, multiple exposures become easier only for the predetermined light selective region.

It is preferable that the manufacturing apparatus of the second aspect of the invention further include a diffractive element provided in the opening of the mask and leading the exposure beam to diffract toward the inside of the light selective region.

In the manufacturing apparatus of the second aspect of the invention, the diffractive element diffracts the exposure beam toward the inside of each light selective region. Thus, by designing the diffractive element to suppress the spread of beam diffusion, the exposure beam can be prevented from spreading to other light selective regions.

Consequently, the selective wavelength of light selected for each light selective region on one base member can be varied with a high level of precision because the interference fringe is prevented from mixing with the adjacent light selective regions.

Moreover, the incidence angle of the exposure beam incident onto each light selective region can be easily varied since a diffractive element with diffraction angle that becomes a predetermined incidence angle may be used.

The cost of the entire manufacturing apparatus can be suppressed because the diffractive element can be easily manufactured by methods such as a photolithographic method and by etching.

Moreover, if the base member is formed in a cubic shape, the diffractive element can be easily formed in a rectangular shape. Thus, the light utilization efficiency of the exposure beam can be improved by forming the diffractive element in a rectangular shape.

It is preferable that, in the manufacturing apparatus of the second aspect of the invention, the incidence angle adjusting section be a liquid crystal element including: a first substrate on which a center electrode formed in a circular form and concentric-orbicular electrodes with various radius are formed; a second substrate including a common electrode formed on a surface of the second substrate; and a liquid crystal layer provided between the first substrate and the second substrate.

In the manufacturing apparatus of the second aspect of the invention, the optical distance between the center electrodes, the orbicular electrodes, and the common electrodes changes because the oriented state of liquid crystals changes when the voltage applied to the center electrodes, orbicular electrodes, and common electrodes is controlled.

As result, the light condensing position of liquid crystal element changes when the applied voltage is changed.

Accordingly, the wavelength selective element can be manufactured by processes similar to the method for manufacturing a conventional liquid crystal panel, so its production cost can be suppressed.

Moreover, the incidence angle of the exposure beam incident onto the light selective region can be adjusted only by controlling the voltage. Thus, there is no need to provide members to move the exposure beam physically.

That is, alignment of the exposure beam and the base member becomes easier, and the product cost of the wavelength selective element can be further suppressed.

It is preferable that, in the manufacturing apparatus of the second aspect of the invention, the two exposure beams be constituted from a first exposure beam and a second exposure beam, the incidence angle at which the first exposure beam is incident onto the light selective region is adjusted by the incidence angle adjusting section, and the incidence angle at which the second exposure beam is incident onto the light selective region is fixed.

In the manufacturing apparatus of the second aspect of the invention, one exposure beam (first exposure beam) from the two exposure beams is adjusted, and the incidence angle of the other exposure beam (second exposure beam) is fixed.

In this constitution, by adjusting the first exposure beam, the distance between streaks of the interference fringes formed in the base member can be varied. Thus, a manufacturing apparatus with simplified production processes can be offered.

It is preferable that, in the manufacturing apparatus of the second aspect of the invention, the mask be provided so as to come in contact with an exposure surface of the base member onto which the exposure beam is incident.

When a clearance exists between the mask and the base member, the exposure beam may pass through this clearance, spread to the adjacent light selective region and have an adverse effect.

However, in the manufacturing apparatus of the second aspect of the invention, the mask provided in contact with the exposure surface of the base member onto which the exposure beam is incident. Thus, the exposure beam can be prevented from spreading to other light selective regions.

A third aspect of the invention provides a manufacturing method for manufacturing a wavelength selective element including light selective regions which include at least first light selective region and second light selective region, which are formed in a base member, and in which a predetermined selective wavelength is selected from the laser light emitted from a plurality of light emitting elements, the manufacturing method including: emitting two exposure beams to a light selective region of the base member; and adjusting two exposure beams so that the angle between the two exposure beams being incident onto the first light selective region is different from the angle between the two exposure beams being incident onto the second light selective region of the light selective regions.

In the manufacturing method of the third aspect of the invention, the two exposure beams are rayed onto one base member.

At this stage, the incidence angle of exposure beam incident onto the light selective region is adjusted.

In this way, by adjusting the angle made by the two exposure beams, the distance between streaks of the interference fringes formed in the light selective region of the base member can be varied.

Accordingly, a selective wavelength can be varied with a high level of precision for each light selective region on one base member with a simple method because the incidence angle of exposure beam can be adjusted so that a predetermined selective wavelength can be selected for each light selective region.

A fourth aspect of the invention provides a light source device, including: a light source emitting light, and the wavelength selective element described above selecting a predetermined wavelength from the light emitted from the light source and leading the light of the predetermined wavelength to pass therethrough.

In the light source device of the fourth aspect of the invention, the light source device selects light of predetermined wavelength using a wavelength selective element and passes through the light emitted from the light source.

At this stage, the speckle noise of light emitted from the light source device can be suppressed because the selective wavelength for each light selective region on one base member of the wavelength selective element can be varied with a high level of precision, as mentioned above.

A fifth aspect of the invention provides an image display device including: the light source device described above; a light modulating device modulating the light emitted from the light source device in accordance with image signal; and a projection device projecting the image formed by the light modulating device.

In the image display device of the fifth aspect of the invention, the light emitted from the light source device is led to be incident onto a light modulating device. The image formed by the light modulating device is projected by the projection device.

At this stage, the light emitted from the light source device, is light with suppressed speckle noise, as mentioned above. Therefore, by providing this light source device in the projector, a clear image with suppressed glare can be displayed.

A sixth aspect of the invention provides a monitor, including: the light source device described above; and an image capturing device capturing object image by using the light emitted from the light source device.

In the monitor of the sixth aspect of the invention, the light source device illuminates the object with the light. The image of the object is captured by image capturing device.

At this stage, as mentioned above, the light emitted from the light source device, is light with suppressed speckle noise, as mentioned above.

Accordingly, a clear image of the object to be captured can be captured by the image capturing device.

DESCRIPTION OF EXEMPLARY EMBODIMENTS

Figure 1A:
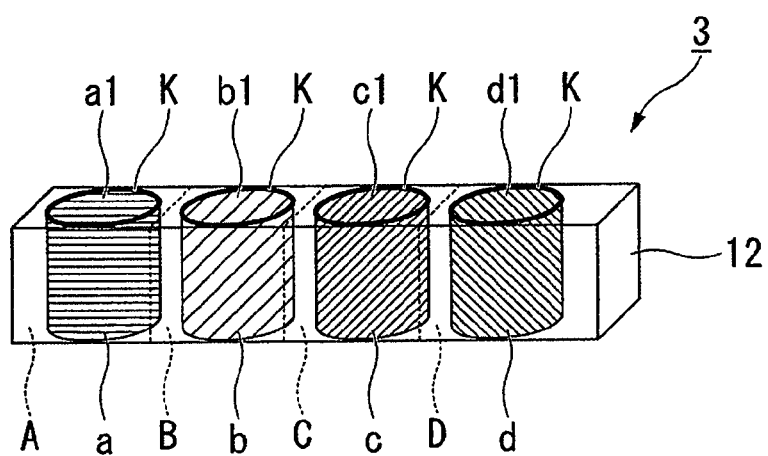
FIG. 1A is a perspective view showing a wavelength selective element related to the first embodiment of the invention.

Hereinafter, the embodiments of the wavelength selective element, the manufacturing apparatus for manufacturing the wavelength selective element, the light source device, the image display device and the monitor related to the invention are described below referring to the drawings.

The scale of each member shown in each drawing has been changed appropriately to a suitable size to enable each member to be easily recognized.

First Embodiment

The first embodiment of the wavelength selective element of the invention is described here referring to FIGS. 1A to 4.

Wavelength selective element 3 is an element that selects and reflects a part of the light (approximately 98% to 99%) of predetermined selective wavelength from the incident laser light.

Figure 1B:
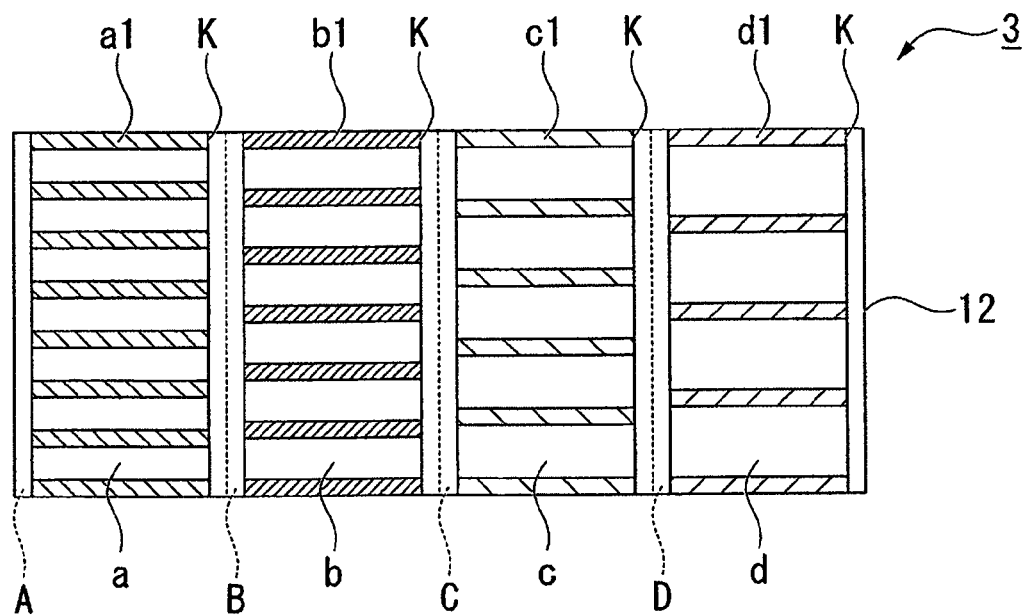
FIG. 1B is a cross-sectional view showing a wavelength selective element related to the first embodiment of the invention.

The wavelength selective element 3 related to this embodiment has a base member 12 provided with four light selective regions A to D in a single direction (one dimensional), as shown in FIGS. 1A and 1B.

Each of the light selective regions A to D has interference regions a to d in a cylindrical shape formed by interference fringes. Each interference fringe has streaks whose pitch (distance) is different from a pith of the other interference fringe. That is, when explaining the relationship between the light selective regions A and B, the first distance between streaks of the interference fringes in the first interference region a is different from the second distance between streaks of the interference fringes in the second interference region b.

The interference regions a to d all have identical cylindrical shape, and are formed at a predetermined distance. That is, the adjacent interference regions are separated from each other by a predetermined distance.

Even if the pitch of streaks of the interference fringes of each light selective region A to D varies, the pitch of streaks of interference fringe of at least one of the interference regions a to d may be different from the pitch of interference fringes of any other interference regions a to d.

Moreover, interference fringes with a plurality of types of streaks whose distances are different are overlapped and exposed in the boundary portion K of each interference region A to D.

This occurs because of the effect of diffracted light due to mask edge occurring during exposure using mask.

Figure 2:
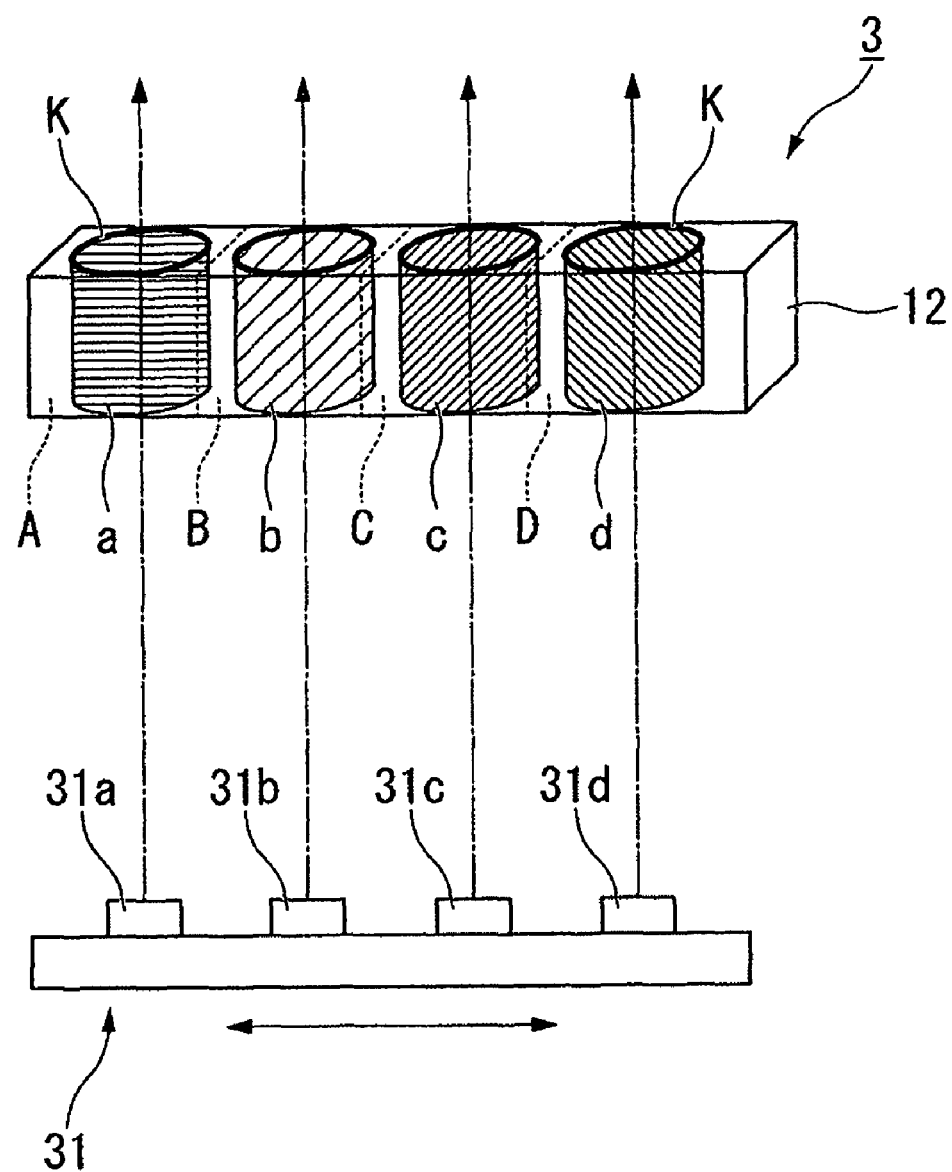
FIG. 2 is a schematic perspective view showing the alignment of a light emission section with the wavelength selective element of FIG. 1A.

Next, as shown in FIG. 2, the alignment of light emission section 31 having light emission elements 31a to 31d that emit laser light incident onto the wavelength selective element 3 with the wavelength selective element 3 is described here.

To lead the light emitted from the light emission section 31 to be incident onto the interference regions a to d of each of the light selective regions A to D of the wavelength selective element 3, the light emission section 31 may be moved in the longitudinal direction of the wavelength selective element 3 and adjusted.

At this stage (aligning the light emission section 31 with the light selective regions A to D), if the light emitted from the light emission section 31 becomes incident onto the boundary portion K of each interference region a to d, the light is diffracted in a plurality of directions. Therefore, the light selection efficiency degrades abruptly.

That is, output intensity of light emitted from the wavelength selective element 3 decreases.

As a result, that the light emitted from the light emission section 31 is not incident onto the interference regions a to d is determined.

Even if the light is incident onto a region other than the interference regions a to d, since the output intensity of light emitted from the wavelength selective element 3 is small, that the light emitted from the light emission section 31 is not incident onto the interference regions a to d is determined.

Consequently, the light emission section 31 is aligned with the wavelength selective element 3 so that the output intensity of light emitted from the wavelength selective element 3 increases.

The wavelength selective element 3 related to this embodiment includes the interference regions a to d formed by interference fringes with the streaks whose pitches are different from each other.

When this wavelength selective element is used in a light source device, and light is led to be incident onto each interference region a to d, the selective wavelength in each interference region a to d can be varied with a high level of precision; therefore, the speckle noise of light emitted from the wavelength selective element 3 can be suppressed.

Moreover, the two adjacent interference regions a to d are formed with the predetermined distance therebetween. Therefore, when the light is incident on to an outer region from the interference regions a to d, the output intensity of light decreases.

Also, since the two adjacent interference regions a to d are formed with the predetermined distance therebetween, that is, since the two adjacent interference regions are formed so that the two adjacent interference regions are separated from each other by a predetermined distance, when the light is incident onto an outer region from the interference regions a to d, the output intensity is small.

As a result, it is possible to align the light emission section 31 with the wavelength selective element 3 so that the light is led to be accurately incident onto the interference regions a to d.

Particularly according to this embodiment, a plurality of types of interference fringes are overlapped and exposed in the boundary portion K of each interference region A to D; therefore, when the light emission section 31 is not aligned with the wavelength selective element 3, the output intensity abruptly decreases.

As a result, the misalignment can be easily determined, and light emitted from the light emission section 31 can be led to be incident onto the optimum position of the wavelength selective element 3.

Moreover, interference regions a to d can be easily formed because the plurality of interference regions a to d have identical cylindrical shape.

The wavelength selective element 3 had a configuration in which a plurality of types of interference fringes were overlapped and exposed in the boundary portion K of the light selective regions A to D, but a plurality of types of interference fringes need not necessarily be overlapped and exposed in the boundary portion K of the light selective regions A to D.

Moreover, the interference regions a to d all had identical cylindrical shape, but they may be cylindrical shapes of different sizes.

Figure 3:
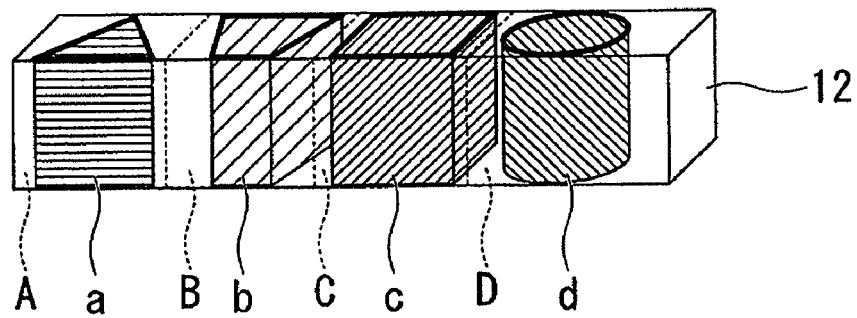
FIG. 3 is a perspective view showing an example of modification of the wavelength selective element related to the first embodiment of the invention.

The shapes of the interference regions a to d need not be limited to cylindrical shapes. As shown in FIG. 3, each light selective region A to D may be of a different shape.

That is, the shape of the interference region a of the light selective region A may be that of a triangular prism, the shapes of the interference regions b and c of the light selective regions B and C may be that of a quadrangular prism, while the shape of the interference region d of the light selective region D may be cylindrical.

Moreover, the pitch of the streaks of the interference regions a to d may be changed depending on the distance between the light emission elements 31a to 31d of the light emission section 31.

The diameter of the exposed surface a1 to d1 of the interference regions a to d shown in FIGS. 1A and 1B, that is, the size of the diameter of each interference region a to d, may be varied depending on the size of the openings in the plurality of light emission elements 31a to 31d of the light emission section 31.

Figure 4:
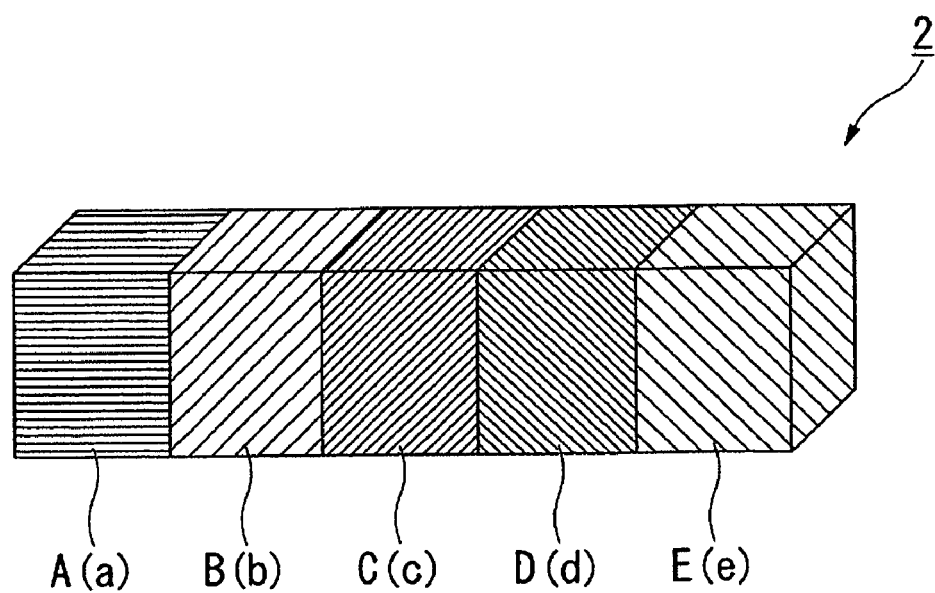
FIG. 4 is a perspective view showing an example of modification of the wavelength selective element related to the first embodiment of the invention.

The interference regions a to d in this embodiment has a cylindrical shape, but as shown in FIG. 4, they may be wavelength selective elements 2 formed by the interference regions a to e in each of the five complete light selective regions A to E.

Second Embodiment

Figure 5A:
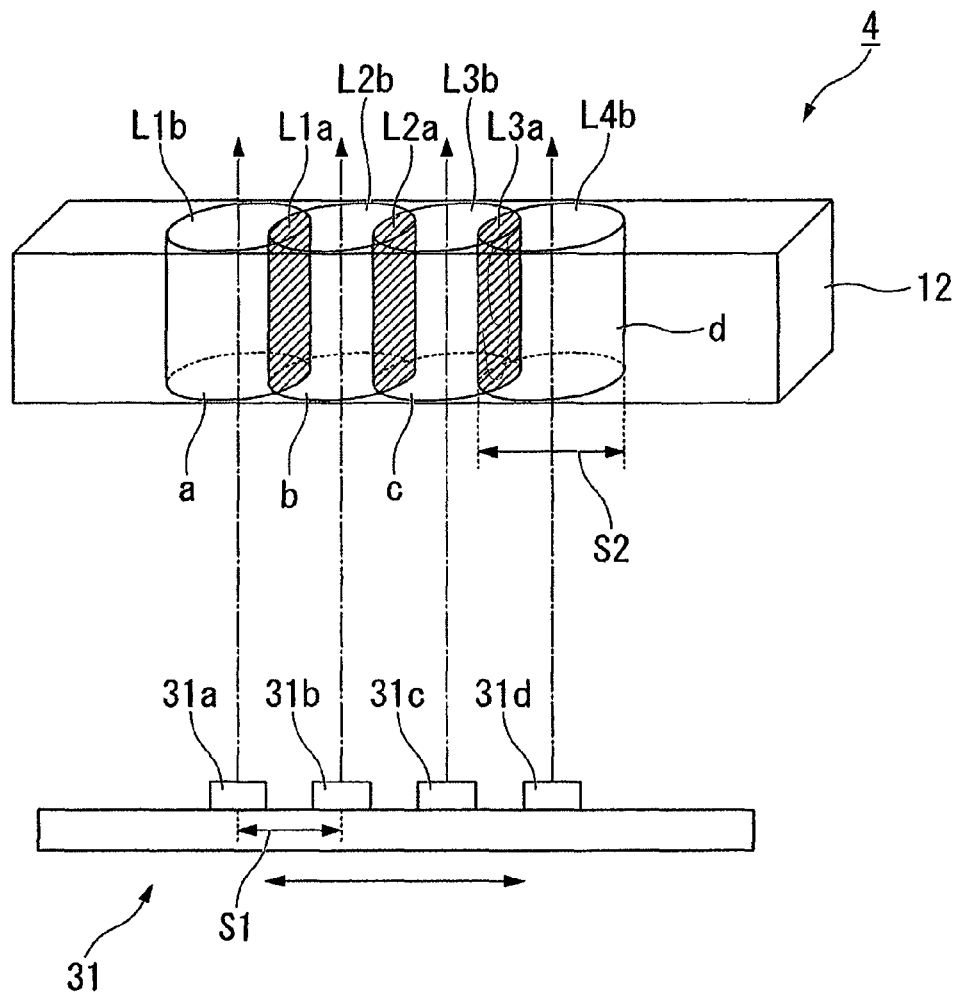
FIG. 5A is a perspective view showing a wavelength selective element related to the second embodiment of the invention.
Figure 5B:
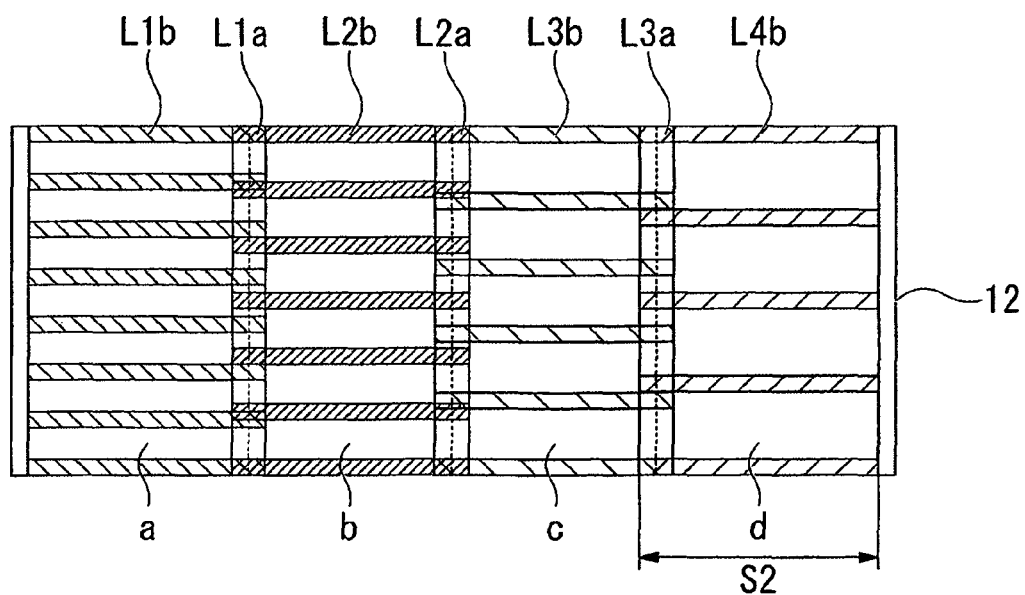
FIG. 5B is a cross-sectional view showing a wavelength selective element related to the second embodiment of the invention.

Next, the second embodiment related to the invention is described here referring to FIGS. 5A and 5B.

In the drawings of each embodiment described below, identical symbols are used for the elements, which are identical to those of the wavelength selective element 3 of the first embodiment, and the explanations thereof are omitted.

The second embodiment differs from the first embodiment at the point where the two adjacent interference regions a to d overlap in the wavelength selective element 4 related to this embodiment. This embodiment is similar to the first embodiment in all other aspects of the configuration.

A part of the adjacent interference regions a to d overlap in the wavelength selective element 4. That is, the interference region a and the interference region b overlap to form region L1a, the interference region b and the interference region c overlap to form region L2a, and the interference region c and the interference region d overlap to form region L3a.

The regions L1a to L3a of the interference regions a to d are regions in which the incident light selection efficiency decreases. Therefore, light is led to be incident onto regions L1b to L4b, other than the regions L1a to L3a in which the interference regions a to d overlap.

Next, as shown in FIGS. 5A and 5B, the alignment of light emission section 31 having light emission elements 31a to 31d that emit laser light incident onto the wavelength selective element 4 with the wavelength selective element 4 is described here.

To lead light to be incident onto the regions L1b to L4d other than the regions L1a to L3a in which the interference regions A to D of the wavelength selective element 4 overlap, the light emission section 31 is moved in the longitudinal direction of the wavelength selective element 3 and its position adjusted.

At this stage (aligning the light emission section 31 with the regions L1b to L4d), if the light emitted from the light emission section 31 becomes incident onto the regions L1a to L3a of each interference region a to d, the light selection efficiency of the light emitted from the wavelength selective element 4 degrades abruptly.

That is, output intensity of light emitted from the wavelength selective element 4 decreases.

Accordingly, whether light emitted from the light emission section 31 is incident onto the regions L1b to L4d, other than the regions L1a to L3a in which the interference regions a to d overlap can be determined. Therefore, the light emission section 31 is aligned with the wavelength selective element 4 so that the output intensity of light emitted from the wavelength selective element 4 increases.

The pitch of the light emission elements 31a to 31d of the light emission section 31 in the wavelength selective element 4 related to this embodiment is extremely small. This is effective when the opening is also very small.

Specifically, when the interference regions a to d are overlapped, and when the interference regions a to d are also made small, there is concern that the interference regions a to d are overlapped in the boundary portion of the interference regions a to d in which the output intensity decreases, and the predetermined selective wavelength can no longer be selected.

In contrast, in the second embodiment, the interference regions a to d with diameter S2 greater than the pitch S1 of the light emission elements 31a to 31d are formed and overlapped so that interference regions L1b to L4b with selectable predetermined selective wavelength can be increased.

Moreover, by adjusting the size of the overlapping regions L1a to L3a, the size of the interference regions L1b to L4b with selectable predetermined selective wavelength can be increased. Therefore, the optimum wavelength selective element 4 can be obtained in the light emission section 31.

Accordingly, a wavelength selective element 4 provided with interference regions a to d compatible with light emission section 31 having light emission elements 31a to 31d with small pitch can be offered while performing satisfactory alignment.

Third Embodiment

Figure 6:
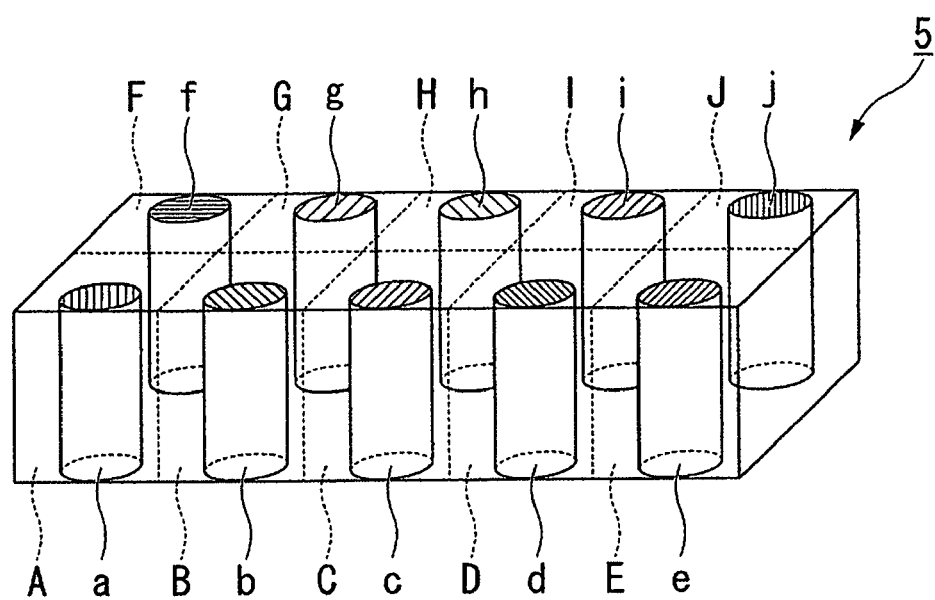
FIG. 6 is a perspective view showing a wavelength selective element related to the third embodiment of the invention.

Next, the third embodiment related to the invention is described here referring to FIG. 6.

This embodiment differs from the first embodiment in that the light selective regions A to J are arrayed in a two-dimensional arrangement in the wavelength selective element 5 related to this embodiment.

This embodiment is similar to the first embodiment in all other aspects of the configuration.

As shown in FIG. 6, the wavelength selective element 5 has the light selective regions A to E in a direction, and similarly has light selective regions F to J in a direction parallel to the direction in which the light selective regions A to E are arrayed.

Moreover, interference regions a to j of cylindrical shape similar to those in the first embodiment are formed in the light selective regions A to J.

In this constitution, even if the pitch of streaks of the interference fringes in each interference region a to j varies, the pitch of interference fringe of at least one of the interference regions a to j may be different from the pitch of streaks of the interference fringes of other interference regions a to j, similar to the one-dimensional case of wavelength selective element 5 having two-dimensional light selective regions A to J.

Since the wavelength selective element 5 related to this embodiment is provided with interference regions a to j arranged in a two-dimensional arrangement, for example, even when the light emission elements of the light emission section are arranged in a two-dimensional arrangement, the wavelength selective element can be used.

Moreover, by using the wavelength selective element 5 having interference regions a to j arranged in a two-dimensional arrangement, the device can be miniaturized by using the wavelength selective element 5 in a light source device compared to a wavelength selective element arranged with the interference regions a to j in a one-dimensional arrangement.

Fourth Embodiment

Figure 7:
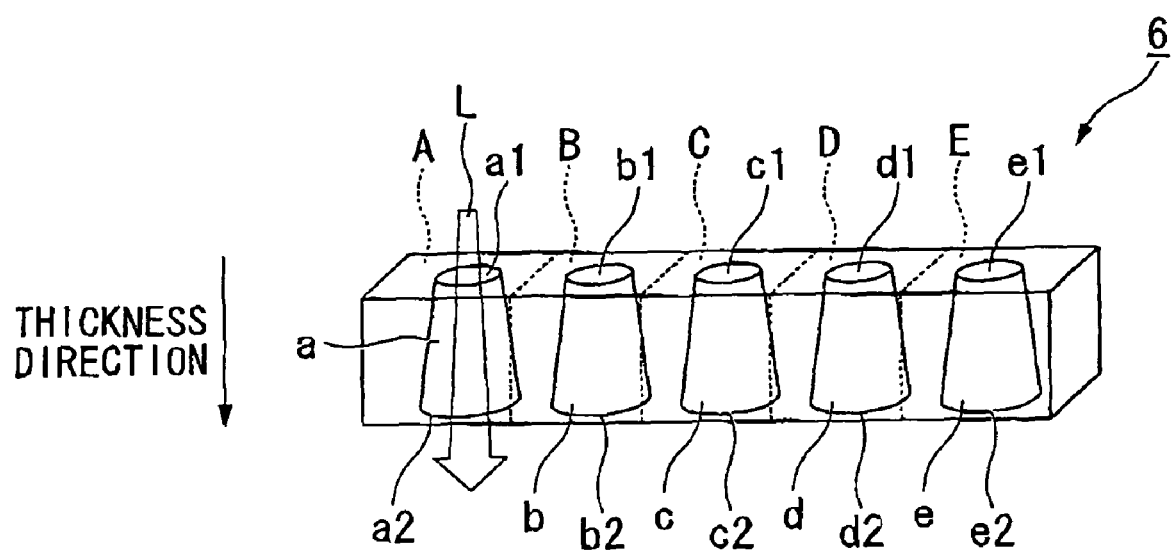
FIG. 7 is a perspective view showing a wavelength selective element related to the fourth embodiment of the invention.

Next, the fourth embodiment related to the invention is described here referring to FIG. 7.

The wavelength selective element 6 related to this embodiment differs from that in the first embodiment in that the shape of the interference regions a to e of the light selective regions A to E is different in the thickness direction.

This embodiment is similar to the first embodiment in all other aspects of the configuration.

As shown in FIG. 7, the wavelength selective element 6 has a shape of the interference regions a to e that differs in the thickness direction (direction in which light progresses).

More specifically, the interference regions a to e have a cross-sectional area that gradually increases in a direction perpendicular to the thickness direction from the exposed surface a1 to e1 to the exposed surface a2 to e2 of the interference regions a to e so that the shape becomes tapered.

That is, the exposed surfaces a2 to e2 of the interference regions a to e are greater than the exposed surfaces a1 to e1.

Light is led to be incident from the exposed surfaces a1 to e1 and emitted from the exposed surfaces a2 to e2 of the wavelength selective element 6.

The size of the exposed surfaces a1 to e1 in the wavelength selective element 6 related to this embodiment for leading the light to be incident is smaller compared to the size of the exposed surfaces a2 to e2. Therefore, when the light is incident onto an outer region from the interference regions a to e of the wavelength selective element 6, the light selection efficiency degrades abruptly, and the misalignment of the light emission section with the wavelength selective element 6 can be easily determined.

Since the light L that propagates to the internal part of the wavelength selective element 6 spreads a little, by making the size of the exposed surfaces a2 to e2 on the emitting side larger than the exposed surfaces a1 to e1 on the incident side, the light L is emitted without the incidence onto an outer region from the interference regions a to e.

As a result, the light utilization efficiency of light which is incident onto the wavelength selective element 6 can be improved.

A configuration in which the shape of the interference regions a to e differs in the thickness direction was explained as an example of tapered shape in this embodiment. However, the invention is not limited to this shape. A configuration in which the cross-sectional area increases stepwise, or in which the cross-sectional area increases and decreases may be used.

If the spreading of the light L is small, light may be led to be incident onto the exposed surfaces a2 to e1 of the wavelength selective element 6 and light may be emitted from the exposed surfaces a1 to e1.

Fifth Embodiment

Next, the fifth embodiment of manufacturing apparatus for manufacturing the wavelength selective element related to the invention is described here referring to FIG. 8 to FIG. 12.

According to the manufacturing apparatus for manufacturing the wavelength selective element of the invention, either of the wavelength selective elements 2, 3, 4, 5, and 6 mentioned above can be manufactured. The manufacturing method for manufacturing the wavelength selective element 2 is described in this embodiment.

Figure 8:
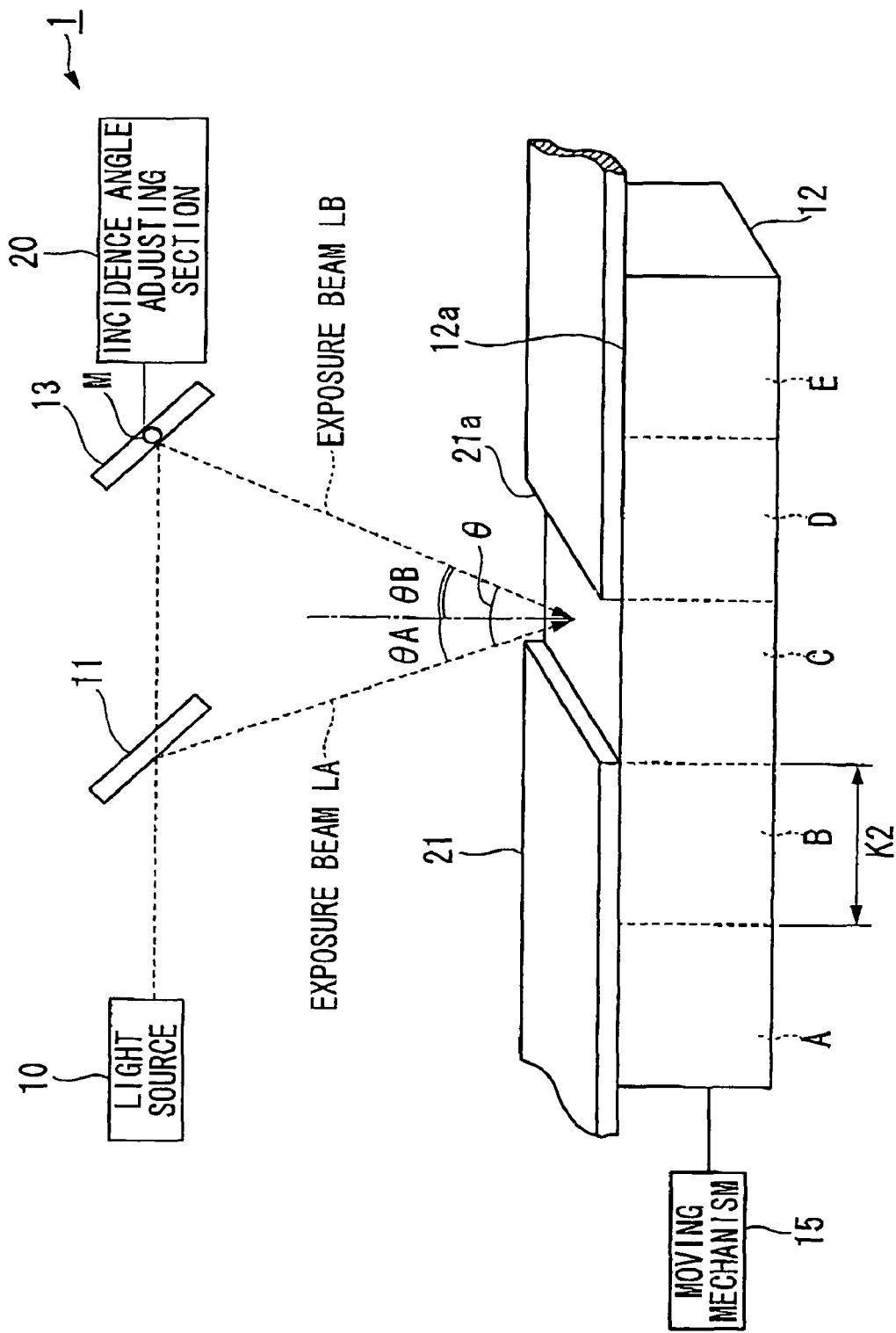
FIG. 8 is a schematic perspective view showing a configuration of a manufacturing apparatus for manufacturing the wavelength selective element related to the fifth embodiment of the invention.

As shown in FIG. 8, the manufacturing apparatus 1 for manufacturing the wavelength selective element 2 related to this embodiment includes a light source 10 emitting laser light, and an incidence angle adjusting section 20 adjusting the emitting direction of the laser light emitted from the light source 10.

An excimer laser (wavelength: 120 nm to 360 nm) may be used for example, as the light source 10.

In the manufacturing apparatus 1 of this embodiment, the case in which five light selective regions A to E are formed in a base member (such as glass) 12 is described here.

The manufacturing apparatus 1 of the wavelength selective element 2 includes a half mirror 11 and a reflecting mirror 13. The half mirror 11 leads apart of the laser light emitted from the light source 10 to pass through, and reflects the laser light remaining after the part of the laser light emitted from the light source 10 has passed through. That is, the half mirror 11 leads a first laser light (first exposure beam) to reflect, and leads a second laser light (second exposure beam) to pass through.

The reflecting mirror 13 reflects the laser light which has passed through the half mirror 11 to the base member 12. That is, the reflecting mirror 13 reflects the second laser light to the base member 12.

The half mirror 11 is disposed at angle with respect to the central axis of the laser light so that the laser light which is incident onto the half mirror 11 is reflected toward the base member 12.

As a result, the exposure beam LA (first exposure beam) reflected by the half mirror 11 becomes incident at an angle of θA with respect to the normal to the base member 12.

The base member 12 should preferably be made of a material with high heat resistance, although this would also depend on the output intensity of laser light incident onto the wavelength selective element 2.

Similar to the half mirror 11, the reflecting mirror 13 also is disposed at an angle with respect to the central axis of the laser light.

The exposure beam LB (second exposure beam) reflected by the half mirror 13 becomes incident at an angle of θB with respect to the normal to the base member 12.

The diameter of the exposure beam LA and the exposure beam LB may be 500 μm, for example.

The incidence angle adjusting section 20 is provided in the reflecting mirror 13. The incidence angle adjusting section 20 rotates the reflecting mirror 13 around the rotating shaft M.

That is, the incidence angle adjusting section 20 can change θB, the incidence angle of the exposure beam L2 incident onto the base member 12 by changing the direction of reflection of the exposure beam LB by rotating the reflecting mirror 13.

That is, the incidence angle adjusting section 20 adjusts the incidence angle at which at least one of the two exposure beams is incident onto the light selective regions, and adjusts the two exposure beams so that the angle between the two exposure beams being incident onto the first light selective region is different from the angle between the two exposure beams being incident onto the second light selective region.

Moreover, the exposure beam LA reflected by the half mirror 11 and the exposure beam LB reflected by the reflecting mirror 13 is rayed (incident) onto the base member 12 at an angle θ (sum of the incidence angle θA and incidence angle θB) performing multiple exposures.

The distance between streaks of the interference fringes formed on the base member 12 varies depending on this angle θ.

Interference fringes are formed on the base member 12 so that the distance between the streaks becomes approximately half the length of the selective wavelength selected in each of the light selective regions A to E.

The angle θ may be an angle in the range of 40 to 140 degrees.

Moreover, the incidence angle θB of the exposure beam LB is adjusted so that the change in the incidence angle θB becomes 0 to 20 degrees in each of the light selective regions A to E.

As a result, the distance between streaks of the interference fringes formed in each of the light selective regions A to E becomes 10 nm.

In this embodiment, exposure beams LA and LB are rayed onto the five light selective regions A to E in the base member 12, and light selective regions A to E are formed so that the selective wavelengths of the light selective regions A to E are different from each other.

Figure 9:
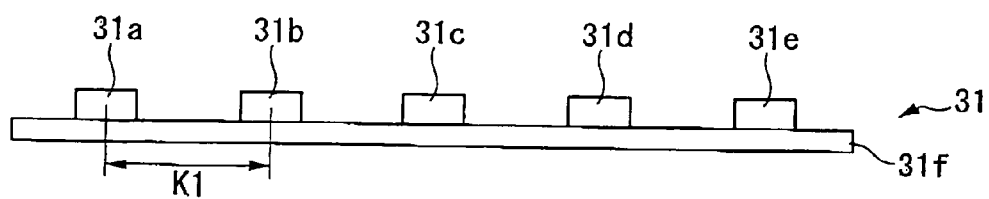
FIG. 9 is a cross-sectional view showing a light emission section that emits light on a wavelength selective element related to the fifth embodiment of the invention.

That is, as shown in FIG. 9, when a light emission section having five light emission elements 31a to 31e is used as the light emission section 31, light selective regions A to E are formed at positions corresponding to the disposition of the light emission elements 31a to 31e.

More specifically, distance K1 between the adjacent light emission elements 31a to 31e of the light emission section 31 is 250 μm. As shown in FIG. 8, the width K2 in the longitudinal direction of the light selective regions A to E is 250 μm.

In this embodiment, each of the light selective regions A to E is subjected to multiple exposure using the mask 21.

Figure 10:
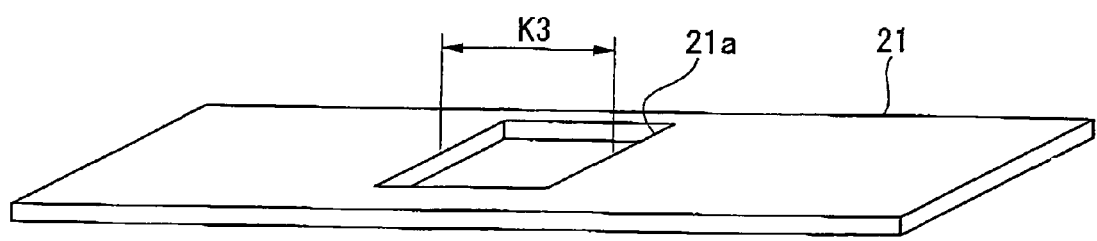
FIG. 10 is a perspective view showing a mask used in the manufacturing apparatus for manufacturing the wavelength selective element related to the fifth embodiment of the invention.

As shown in FIG. 10, opening 21a that suits the light selective regions A to E is formed in the mask 21.

To form the cylindrical interference regions a to d as shown in FIGS. 1A and 1B, a mask having a cylindrical opening may be used.

That is, an appropriate mask with an opening that suits the shape of the interference regions a to d may be used.

By using this mask 21, only the light selective regions A to E corresponding to the opening 21a are subject to multiple exposures, while the exposure beams LA and LE being incident onto all other light selective regions is screened.

Moreover, a moving mechanism 15 is provided in the base member 12.

With this moving mechanism 15, the base member 12 is moved in the longitudinal direction corresponding to the light selective regions A to E for multiple exposure so that the predetermined light selective regions A to E are subjected to multiple exposure.

The dimension of K3, the opening 21a of the mask 21 is 250 μm, the same as the width K of the light selective regions A to E.

Different dimensions of the opening of mask 21 may be used for each of the light selective regions A to E, but since the widths of the light selective regions A to E are equal in this embodiment, the light selective regions A to E can be subjected to multiple exposure by moving the base member 12 in the longitudinal direction by 250 μm each increment.

Next, using the manufacturing apparatus 1 of this embodiment configured as described above, the method for manufacturing the wavelength selective element 2 is described here.

Figure 11A:
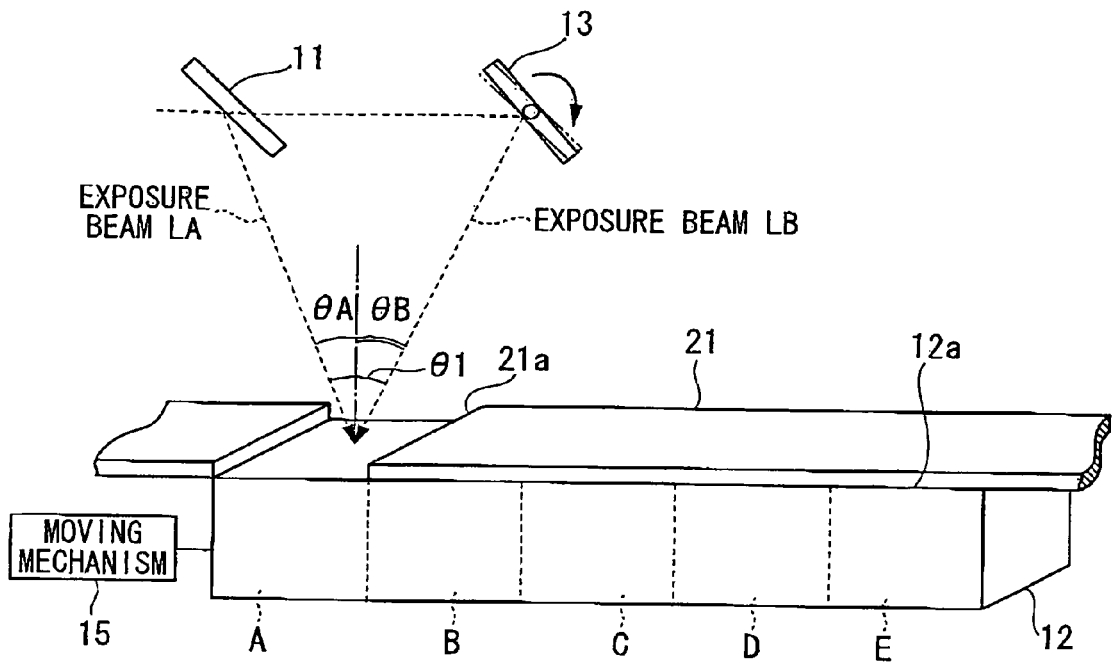
FIGS. 11A and 11B are schematic perspective views explaining an exposure process by a manufacturing apparatus for manufacturing the wavelength selective element related to the fifth embodiment of the invention.

Firstly, as shown in FIG. 11A, the base member 12 is moved by the moving mechanism 15 so that the opening 21a is positioned at the light selective region A, and the mask 21 is brought into contact with the exposure surface 12a of the base member 12.

Using the incidence angle adjusting section 20, laser light is emitted from the light source 10 and adjustment is made so that the angle θ formed by the exposure beam LA and the exposure beam LB becomes θ1, and the light selective region is subjected to multiple exposure.

Figure 11B:
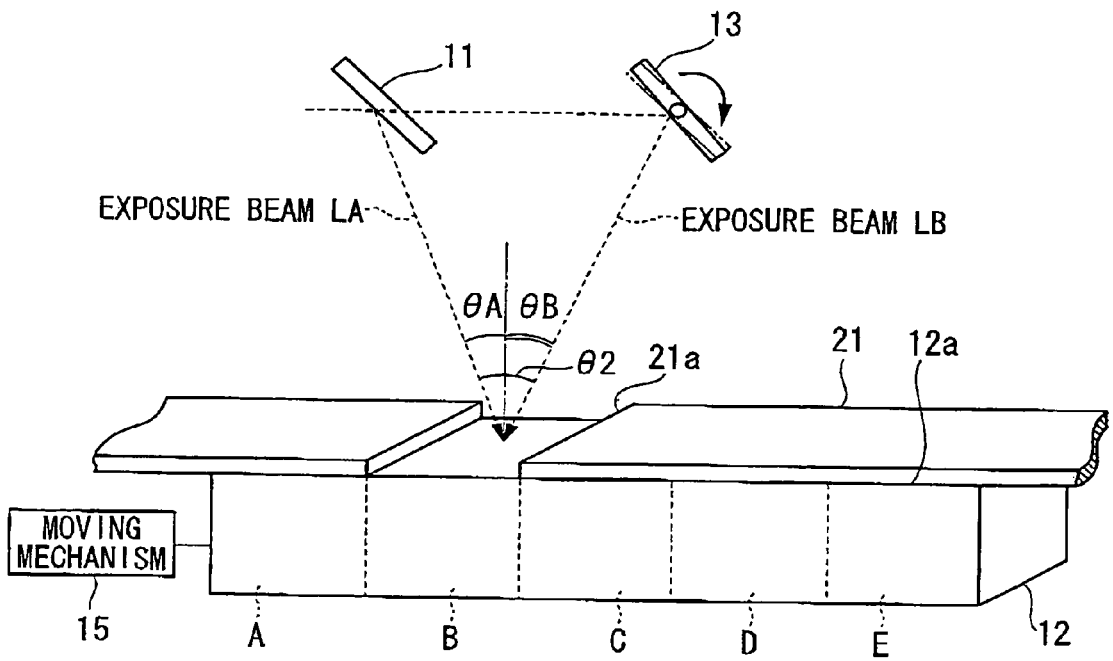

Next, as shown in FIG. 11B, the base member 12 is moved by the moving mechanism 15 so that the opening 21a is positioned at the light selective region B, and the mask 21 is brought into contact with the exposure surface 12a of the base member 12.

Using the incidence angle adjusting section 20, the reflecting mirror 13 is rotated, laser light is emitted from the light source 10 and adjustment is made so that the angle θ formed by the exposure beam LA and the exposure beam LB becomes θ2, greater than θ1, and the light selective region is subjected to multiple exposure.

Moreover, similar to the light selective regions A, B, the mask 21 is brought into contact with the base member 12 so that the opening 21a is positioned at the light selective region C.

Using the incidence angle adjusting section 20, adjustment is made so that the angle θ formed by the exposure beam LA and the exposure beam LB becomes θ3, greater than θ2, and the light selective region C is subjected to multiple exposure.

Next, for the light selective region D also similarly, adjustment is made so that the angle formed by the exposure beam LA and the exposure beam LB becomes θ4, greater than θ3, and this region is subjected to multiple exposure.

Furthermore, for the light selective region D also similarly, adjustment is made so that the angle formed by the exposure beam LA and the exposure beam LB becomes θ5, greater than θ4, and this region is subjected to multiple exposure.

In this way, by adjusting θ, the angle formed by the exposure beams LA and LB incident onto each of the light selective regions A to E, the pitch between streaks of the interference fringes formed in each of the light selective regions A to E of the base member 12 is varied.

Accordingly, the angle θ formed by the exposure beam LA and the exposure beam LB is adjusted so that the selective wavelength in each of the light selective regions A to E becomes λ1 to λ5.

The light source device 30 provided with wavelength selective element 2 manufactured by the manufacturing apparatus 1 is described here.

Figure 12:
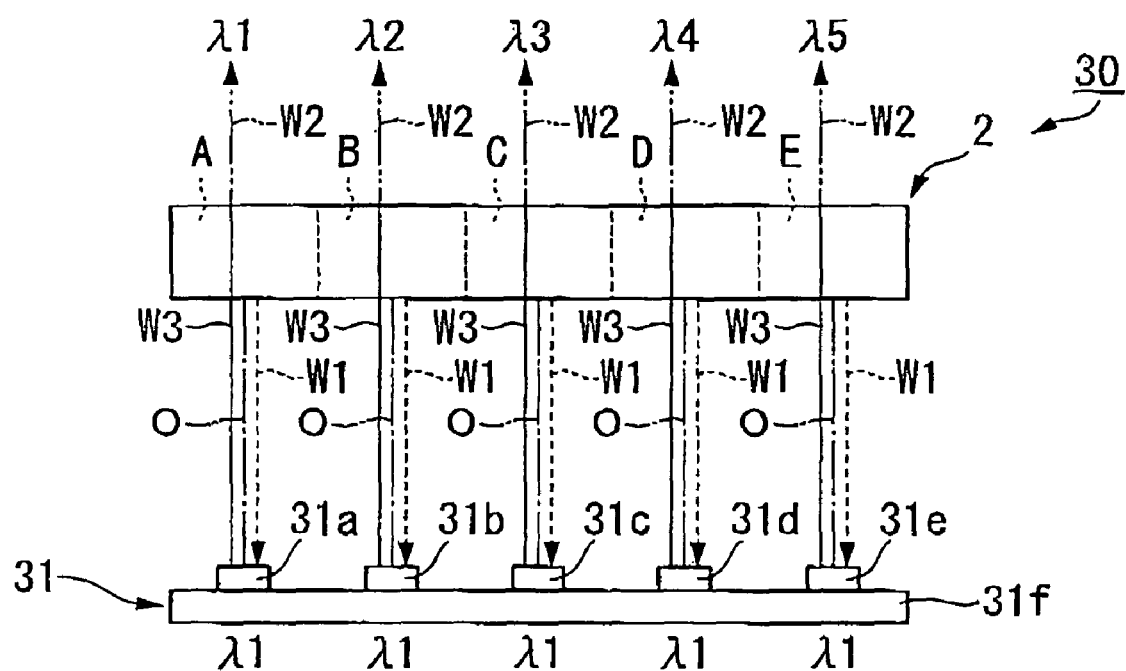
FIG. 12 is a cross-sectional view showing a light source device provided with a wavelength selective element manufactured by the manufacturing apparatus of the wavelength selective element related to the fifth embodiment of the invention.

As shown in FIG. 12, the light source device 30 is provided with the light emission section 31 and the wavelength selective element 2.

As shown in FIG. 12, the light emission section 31 includes five light emission elements that emit laser light 31a, 31b, 31c, 31d, and 31e (semiconductor laser: LD).

The light emission elements 31a to 31e are all supported by the support 31f.

The peak wavelengths of light emitted from the light emission element 31a to the light emission element 31e substantially coincide with each other.

However, there is no need for the wavelengths to coincide perfectly. A slight deviation is acceptable.

Usually, the peak wavelengths differ by a few nm depending on manufacturing error or the like, in the light emission element.

The wavelength selective element 2 selects a part (approximately 98 to 99%) of the light W1 (broken line shown in FIG. 12) of predetermined selective wavelength from the incident laser light, and reflects it toward the light emission section 31. Thus, the wavelength selective element 2 functions as the resonator mirror of the light emission elements 31a to 31e. Also, the wavelength selective element 2 passes through the laser light which has not been reflected (dashed and two-dotted line shown in FIG. 12).

An optical element such a hologram having a periodic lattice may be used, for example, as the wavelength selective element 2.

The light W3 (solid line shown in FIG. 12) of basic wave emitted from the light emission section 31 is repeatedly reflected between the light emission section 31 and the wavelength selective element 2. After amplification, the amplified light is emitted from the wavelength selective element 2 as the laser light W2.

The wavelength selective element 2 passes through light of various wavelengths, but only light of predetermined wavelength from these wavelengths gets amplified.

The intensity of amplified light is noticeably high compared to the intensity of light of other wavelengths.

Thus, the light W2 that has passed the wavelength selective element 2 can be treated as practically a single wavelength light.

The wavelength of this light W2 is generally the same as the selective wavelength of the wavelength selective element 2, that is, the wavelength of light W1 reflected by the wavelength selective element 2.

The wavelength selective element 2 reflects a part (approximately 98 to 99%) of light of predetermined selective wavelength. Thus, the remaining (approximately 1 to 2%) part of the light will be used as output light.

Here, the light selective regions in which light emitted from the light emission elements 31a, 31b, 31c, 31d, and 31e is selected in one base member composed of the wavelength selective element 2, are taken as the light selective regions A, B, C, D, and E, respectively.

However, the light selective regions A to E are continuous regions in which the magnitude of the selective wavelength and strain gradually change in practice. Therefore, no physical boundary exists between these regions.

Moreover, the wavelength of light W1 reflected by the light selective regions A to E become λ1, λ2, λ3, λ4, and λ5, respectively.

In this constitution, since the wavelength of light W1 reflected by the wavelength selective element 2 varies according to each of the light selective regions A, B, C, D, and E, the reflection is repeated between the light emission section 31 and the wavelength selective element 2, and after amplification, the wavelength of light W2 emitted from the wavelength selective element 2 also varies according to each of the light selective regions A, B, C, D, and E.

As described earlier, the wavelength of light W2 emitted from the wavelength selective element 2 is practically the same as the wavelength of light W1 reflected from the wavelength selective element 2.

Thus, the wavelengths of light W2 emitted from the light selective regions A, B, C, D, and E of the wavelength selective element 2 become $\lambda 1, \lambda 2, \lambda 3, \lambda 4$, and $\lambda 5$, respectively.

Next, a specific example of light source device 30 related to this embodiment is described below.

Firstly, light emission element 31a to light emission element 31e are red semiconductor lasers. The peak wavelength emitted from all these elements is 630 nm.

This peak wavelength need not exactly coincide in all these light emission elements 31a to 31e. A slight deviation is acceptable.

Usually, the peak wavelengths differ by a few nm depending on manufacturing error and or the like, in the light emission element.

In the wavelength selective element 2 of the light source device 30, the exposure beams LA and LB are led to ray onto the wavelength selective element 2 so that the selective wavelengths $\lambda 1, \lambda 2, \lambda 3, \lambda 4$, and $\lambda 5$ in the light selective regions A, B, C, D, and E of the wavelength selective element 2 become 630 nm, 629 nm, 628 nm, 627 nm, and 626 mm, respectively (the maximum difference in the selective wavelengths is 4 nm).

As a result, the wavelengths of light W3 emitted from the light selective regions A to E of the wavelength selective element 2 become 630 nm, 629 nm, 628 nm, 627 mm, and 626 nm, respectively.

According to the manufacturing apparatus 1 and the manufacturing method for manufacturing the wavelength selective element 2 related to this embodiment, the incidence angle θB incident onto the base member 12 of the exposure beam LB can be adjusted. Therefore, the distance between streaks of the interference fringes formed in each of the light selective regions A to E of the base member 12 can be varied using the incidence angle adjusting section 20.

That is, the incidence angle of the exposure beam LB can be adjusted so that the predetermined selective wavelength can be selected according to each of the light selective regions A to E by the incidence angle adjusting section 20.

Consequently, the selective wavelength of light selected for each light selective region on one base member 12 can be varied with a high level of precision with a simple configuration.

In the light source device 30 including the wavelength selective element 2 related to this embodiment, even if the peak wavelengths of laser light emitted from the light emission element are identical, light of differing wavelengths within the bandwidth can be amplified and extracted because laser light emitted from the light emission elements 31a to 31e has bandwidth.

That is, when the light emitted from each of the light emission elements 31a to 31e is resonated within each of the light selective regions A to E of the wavelength selective element 2, the wavelengths of light amplified in the resonator mirror structure and emitted from each region will be different.

That is, according to the invention, since the wavelength selective element does not emit light of a single wavelength conventionally, the wavelength band of light passing through the wavelength selective element will generally spread.

As a result, the coherence of amplified light emitted from each of the light selective regions A to E of the wavelength selective element 2 reduces, thus enabling the speckle noise to be suppressed.

That is, the manufacturing apparatus 1 for wavelength selective element 2 of this embodiment is of simplified construction, reduces the coherence of light from a plurality of laser light emitting members, and enables production of wavelength selective element with suppressed speckle noise.

The reflecting mirror 13 may be fixed, and an incidence angle adjusting section may be provided in the half mirror 11 to adjust the incidence angle θ of the laser light incident onto the base member 12.

Moreover, the incidence angle adjusting section may be provided in either the half mirror 11 or the reflecting mirror 13, and the incidence angle θA of the exposure beam LA and the incidence angle θB of the exposure beam LB may be adjusted.

In this configuration, the moving mechanism 15 need not be used because the exposure beams LA and LB are led to ray onto the desired light selective regions A to E without moving the base member 12 using the moving mechanism 15.

Also, the base member 12 may be moved in the longitudinal direction, but the position of the base member 12 may be fixed, and the mask 21 may be moved and the exposure position of the light selective regions A to E may be changed.

The angle θ formed by the exposure beam LA and the exposure beam LB was adjusted, as the method of changing the distance between streaks of the interference fringes for each of the light selective regions A to E. However, the pitch of the interference fringes can also be changed by taking the exposure beam LA and the exposure beam LB as plane waves or spherical waves.

The width K2 of the light selective regions A to E can be change appropriately by changing the size of the opening 21a of the mask 21 according to the distance K2 between the light emission elements 31a to 31e of the light emission section 31 used.

Moreover, according to this embodiment, each of the light selective regions A to E were subjected to multiple exposure by using mask 21 and by ensuring that the exposure beams LA and LB were not incident onto adjacent light selective regions A to E. However, if the base member 12 is made of material so that no effects are cause even when exposure beams LA and LB are incident onto the adjacent light selective regions A to B, then the mask 21 may not be used.

Sixth Embodiment

Figure 13A:
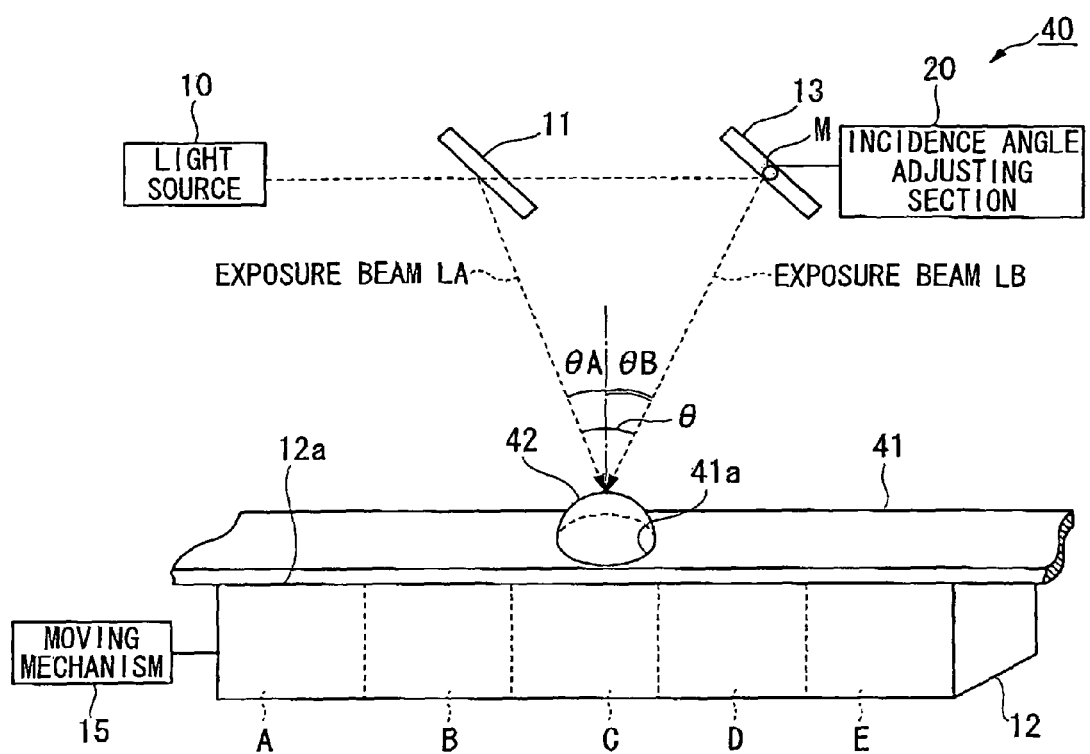
FIG. 13A is a schematic perspective view showing a configuration of a manufacturing apparatus for manufacturing the wavelength selective element related to the sixth embodiment of the invention.
Figure 13B:
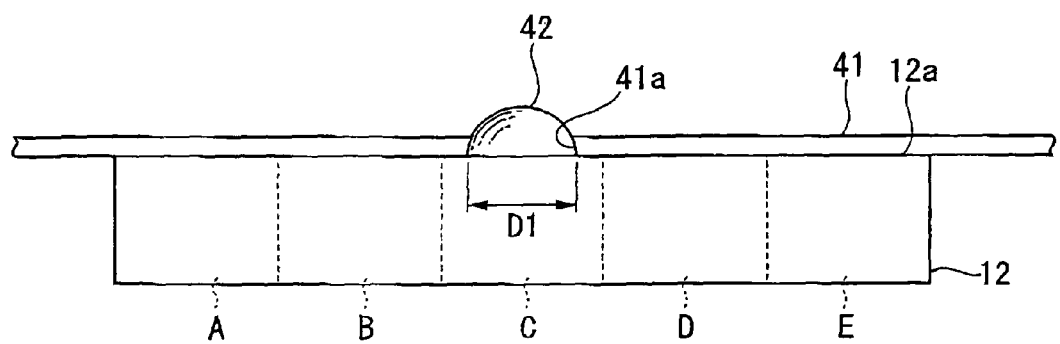
FIG. 13B is a cross-sectional view showing a configuration of a manufacturing apparatus for manufacturing the wavelength selective element related to the sixth embodiment of the invention.
Figure 14:
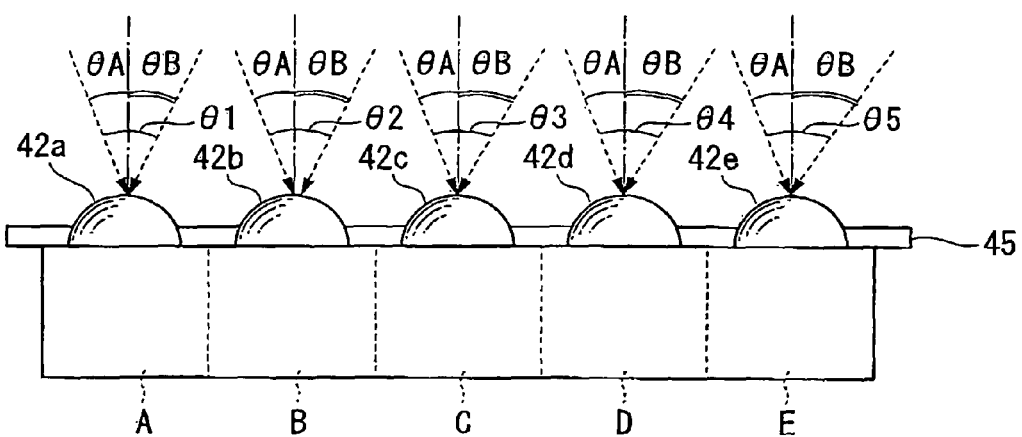
FIG. 14 is a cross-sectional view showing an example of modification of the manufacturing apparatus for manufacturing the wavelength selective element related to the sixth embodiment of the invention.
Figure 15:
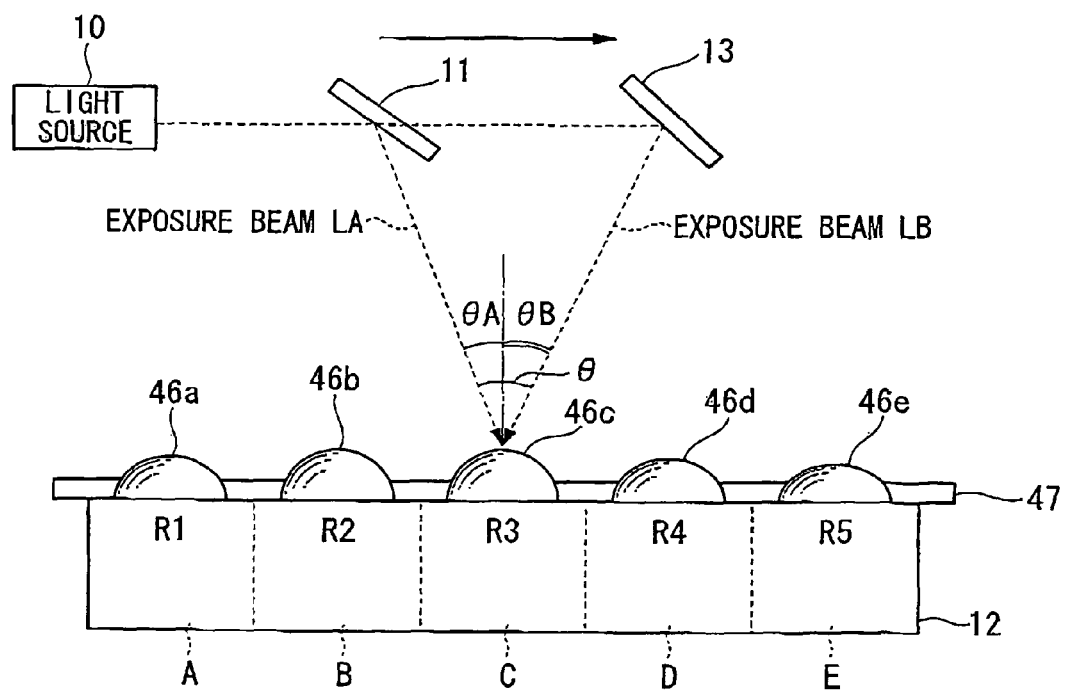
FIG. 15 is a cross-sectional view showing an example of modification of the manufacturing apparatus for manufacturing the wavelength selective element related to the sixth embodiment of the invention.

Next, the sixth embodiment related to the invention is described here referring to FIG. 13 to FIG. 15.

In the drawings of each embodiment described below, identical symbols are used for the elements which are identical to those of the manufacturing apparatus of the wavelength selective element 2 in the fifth embodiment, and the explanations thereof are omitted.

The manufacturing apparatus 40 of the wavelength selective element 2 related to this embodiment differs from that of the fifth embodiment in that the device is provided with a condensing element.

This embodiment is similar to the fifth embodiment in all other aspects of the configuration.

As shown in FIG. 13A, a mask 41 is brought into contact with exposure surface 12a of substrate 12 and subjected to multiple exposure.

As shown in FIG. 13B, a circular opening 41a is formed on this mask 41. A condenser lens 42 (condensing element) is inserted and fitted in this opening 41.

As a result, the mask 41 screens the laser light which is incident onto parts other than the opening 41a.

As shown in FIG. 13B, the diameter D1 of the condenser lens 42 is slightly smaller than the size of the exposure surface 12a of the light selective regions A to E. The diameter may be, for example, 500 μm.

Next, using the manufacturing apparatus 40 of this embodiment configured as described above, the method for manufacturing the wavelength selective element 2 is described here.

Firstly, similar to the fifth embodiment, the base member 12 is moved using the moving mechanism 15 so that the opening 41a is positioned in the light selective region A, and the mask 41 is brought into contact with the exposure surface 12a of the base member 12.

Next, using the incidence angle adjusting section 20, the reflecting mirror 13 is adjusted so that the angle θ formed by the exposure beam LA and the exposure beam LB becomes θ1, and the exposure beams LA and LB are led to be incident onto the condenser lens 42.

Next, similar to the fifth embodiment, the reflecting mirror 13 is adjusted so that the angle formed by the exposure beam LA and the exposure beam LB becomes θ2, θ3, θ4, and θ5, and the light selective regions B, C, D, and E are subjected to multiple exposure.

At this stage, the exposure beams which are incident onto the condenser lens 42 are condensed into the inside of the light selective regions A to E.

As a result, the exposure beams LA and LB are prevented from spreading to adjacent light selective regions A to E.

More specifically, when the light selective region A is subjected to multiple exposure, the exposure beams LA and LB can be prevented from spreading to the light selective region B.

The condenser lens may be so that exposure beam is prevented from spreading. A condenser lens that can loosely condense the beam and one with a very far focal position may be used.

By providing the condenser lens 42 in the manufacturing apparatus 40 and the manufacturing method for manufacturing the wavelength selective element 2 related to this embodiment, the exposure beams LA and LB can be prevented from spreading to the adjacent light selective regions A to E. Thus, the mixing of interference fringes between the adjacent light selective regions A to E can be prevented.

Accordingly, the desired interference fringes can be formed in each of the light selective regions, and the selective wavelength of light selected for each of the light selective regions A to E can be varied with a high level of precision.

Since the exposure beams LA and LB can be condensed using the condenser lens 42, the mask 41 need not be used; the condenser lens 42 alone is adequate.

The mask 41 was moved, but as shown in FIG. 14, a mask 45 arranged with a plurality of condenser lens 42a to 42e with equal curvature may be used.

Even when this mask 45 is used, as mentioned above, the incidence angle θB of the exposure beam LB is adjusted so that the angle formed by the exposure beam LA and the exposure beam LB incident onto each of the condenser lenses 42a to 42e become θ1 to θ5, respectively, and the light selective regions A to E are subjected to multiple exposure.

According to this configuration, the alignment between the mask 45 and the base member 12 becomes simplified because the base member 12 or the mask 45 need not be moved.

Example of modification of the sixth embodiment

A mask 41 provided with one condenser lens 42 was used in the sixth embodiment shown in FIG. 13, but a mask 47 arranged with a plurality of condenser lenses 46a to 46e with different curvature may be used.

This example of modification is described below referring to FIG. 15.

The curvatures of the condenser lenses 46a to 46e are R1, R2, R3, R4, R5, and they are all different.

Moreover, the light source 10, half mirror 11 and the reflecting mirror 13 move in the longitudinal direction of the base member 12.

As a result, when the exposure beam LA and the exposure beam LB are led to be incident onto each of the condenser lenses 46a to 46e in identical direction, the angle of refraction of light varies because of the difference in curvatures of the condenser lenses 46a to 46e.

Consequently, the distance between streaks of the interference fringes occurring in each of the light selective regions A to E of the base member 12 varies because the angle θ formed by the exposure beam LA and the exposure beam LB varies within the base member 12.

Accordingly, in such a configuration using the mask 47, the reflecting mirror 13 may be fixed without installing the incidence angle adjusting section 20.

That is, the condenser lenses 46a to 46e with differing curvature functions as the incidence angle adjusting section and adjusts the incidence angle of the exposure beams LA and LB incident onto each of the light selective regions A to E.

When the mask 47 is used, the exposure beams LA and LB may be rayed onto each of the light selective regions A to E, but exposure beams LA and LB having beam diameter that encompasses all the light selective regions A to E may be used to emit the light at the same time so that the light is rayed onto all the light selective region A to E.

Seventh Embodiment

Figure 16A:
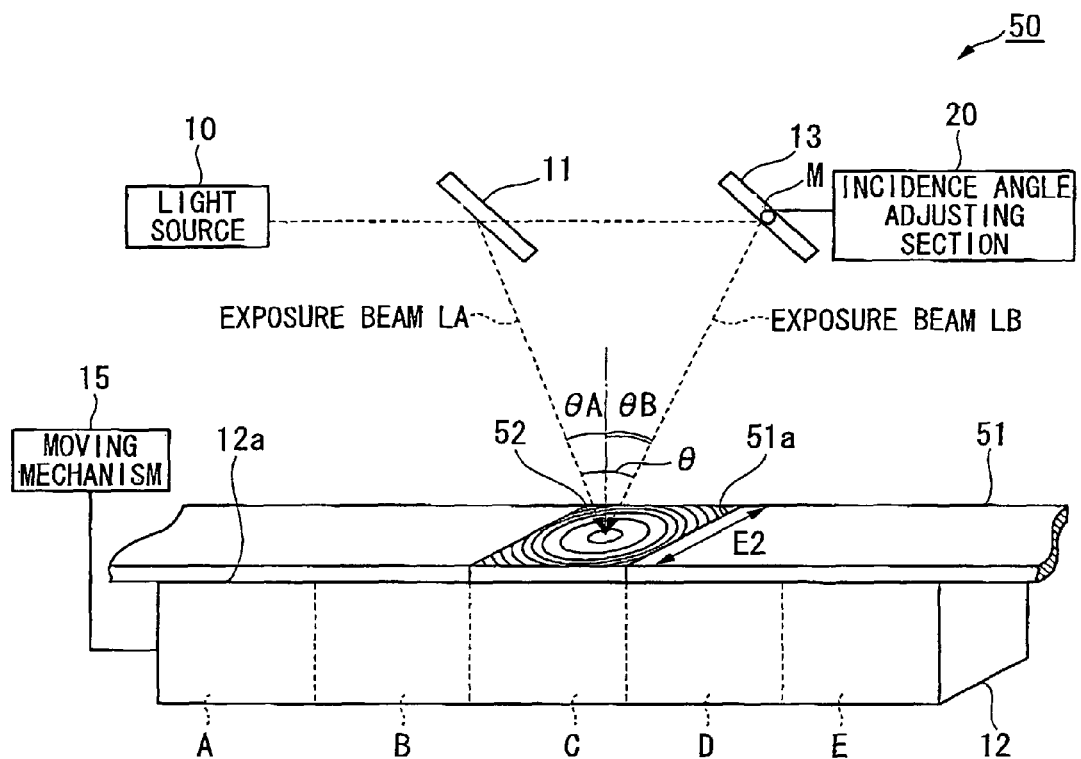
FIG. 16A is a schematic perspective view showing a configuration of a manufacturing apparatus for manufacturing the wavelength selective element related to the seventh embodiment of the invention.
Figure 16B:
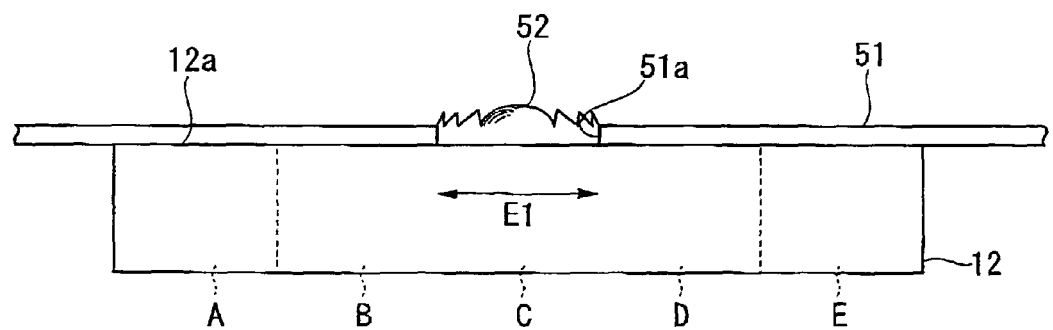
FIG. 16B is a cross-sectional view showing a configuration of a manufacturing apparatus for manufacturing the wavelength selective element related to the seventh embodiment of the invention.

Next, the seventh embodiment related to the invention is described here referring to FIG. 16A and FIG. 16B.

The manufacturing apparatus 50 of the wavelength selective element 2 related to this embodiment differs from that of the fifth embodiment in that the apparatus includes a diffractive element.

This embodiment is similar to the fifth embodiment in all other aspects of the configuration.

As shown in FIG. 16A, a mask 51 is brought into contact with exposure surface 12a of base member 12 and subjected to multiple exposure.

As shown in FIG. 16B, a rectangular shaped opening 51a is formed on this mask 51. A diffractive lens 52 (diffractive element) is inserted and fitted in this opening 51a.

The size of the diffractive lens 52 is almost the same as that of the exposure surface 12a of each of the light selective regions A to E.

More specifically, as shown in FIG. 16B, the dimension E1 of the diffractive lens 52 in the longitudinal direction of the base member 12 is 250 μm, and as shown in FIG. 16A, the width E2 in the exposure surface 12a is 250 μm.

As shown in FIG. 16A, the diffractive lens 52 has a lattice periodic structure of concentric circular orbicular zones, and the lattice period decreases, as the orbicular zones move toward the peripheral edge.

Also, as shown in FIG. 16B, the cross-sectional shape of the diffractive lens 52 is in a serrated form.

This diffractive lens 52 is a phase-type diffraction grating. By varying the phase of the orbicular zone of the order of wavelength, the diffractive lens 52 brings light condensing action and image forming action.

Next, using the manufacturing apparatus 50 of this embodiment configured as described above, the method for manufacturing the wavelength selective element 2 is described here.

Firstly, similar to the fifth embodiment, the base member 12 is moved using the moving mechanism 15 so that the opening 51a is positioned in the light selective region A, and the mask 51 is brought into contact with the exposure surface 12a of the base member 12.

Then the angle θ formed by the exposure beam LA and the exposure beam LB is adjusted by the incidence angle adjusting section 20 so that the angle θ formed by the exposure beams LA and LB becomes θ1, and exposure beams LA and LB are led to be incident onto the diffractive lens 52.

Next, similar to the fifth embodiment, the reflecting mirror 13 is adjusted so that the angle formed by the exposure beam LA and the exposure beam LB becomes θ2, θ3, θ4, and θ5, and the light selective regions B, C, D, and E are subjected to multiple exposure.

At this stage, the exposure beams LA and LB incident onto the diffractive lens 52 are diffracted toward the internal parts of the light selective regions A to E.

As a result, the exposure beams LA and LB are prevented from spreading to adjacent light selective regions A to E.

More specifically, when the light selective region A is subjected to multiple exposure, the exposure beams LA and LB can be prevented from spreading to the light selective region B.

By providing a diffractive lens 52 in the manufacturing apparatus 50 and the manufacturing method for manufacturing the wavelength selective element related to this embodiment, the exposure beams LA and LB are diffracted toward the internal parts of the light selective regions A to E, therefore an effect similar to the sixth embodiment can be obtained.

The cost of the complete manufacturing apparatus 50 can be suppressed because the diffractive element 52 can be manufactured easily by methods such as the photolithographic method and by etching.

Eighth Embodiment

Figure 17A:
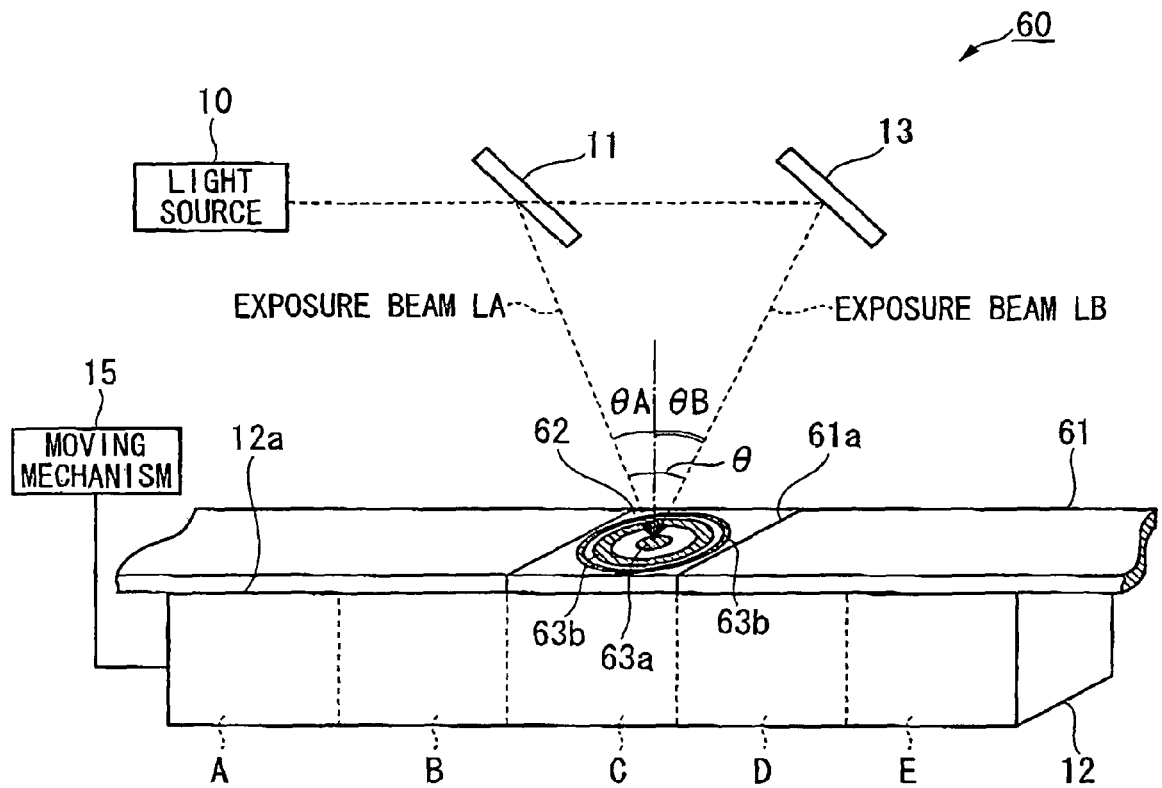
FIG. 17A is a schematic perspective view showing a configuration of a manufacturing apparatus for manufacturing the wavelength selective element related to the eighth embodiment of the invention.
Figure 17B:
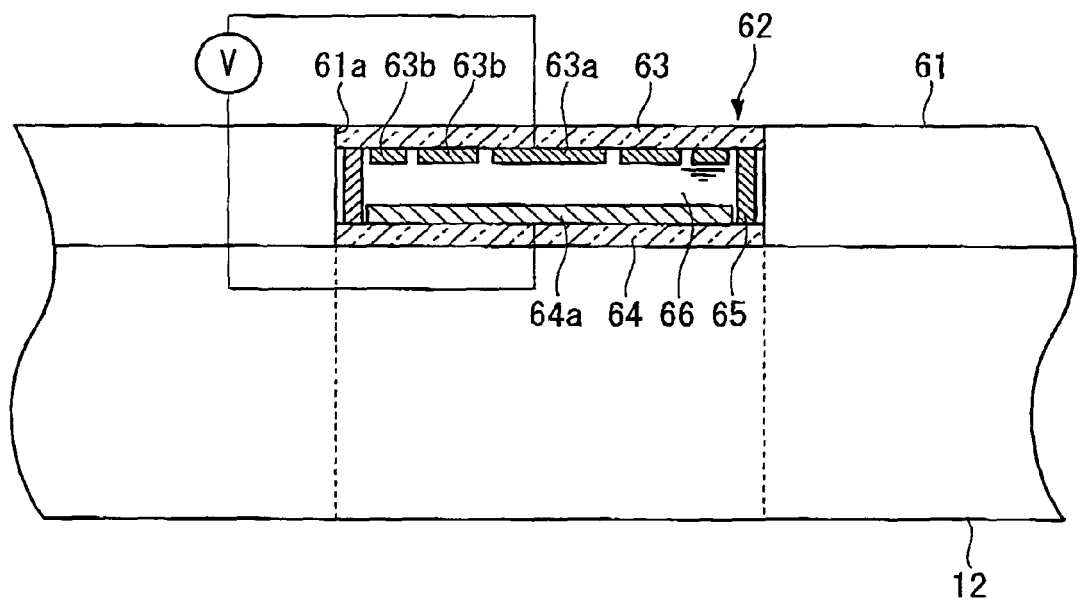
FIG. 17B is a cross-sectional view showing a configuration of a manufacturing apparatus for manufacturing the wavelength selective element related to the eighth embodiment of the invention.

Next, the eighth embodiment related to the invention is described here referring to FIGS. 17A and 17B.

The manufacturing apparatus 60 of the wavelength selective element 2 related to this embodiment differs from that of the fifth embodiment in that the incidence angle adjusting section 20 is a liquid crystal lens 61 (liquid crystal element).

That is, the reflecting mirror 13 is fixed without providing the incidence angle adjusting section 20.

This embodiment is similar to the fifth embodiment in all other aspects of the configuration.

As shown in FIG. 17A, mask 61 is brought into contact with exposure surface 12a of the base member 12 and subjected to multiple exposure.

As shown in FIG. 17B, a rectangular shaped opening 61a is formed in this mask 61. A liquid crystal lens 62 (incidence angle adjusting section) is inserted and fitted in this opening 61a.

As shown in FIG. 17B, the liquid crystal lens 62 includes a first substrate 63 and a second substrate 64. A liquid crystal 66 (liquid crystal layer) is filled through a seal 65 provided between the first substrate 63 and the second substrate 64.

As shown in FIG. 17A, a circular center electrode 63a and a plurality of orbicular electrodes in concentric circles 63b with varying radiuses are formed around the center electrode 63a, on the side where liquid crystal 66 of the first substrate 63 is provided.

On the other hand, as shown in FIG. 17B, a common electrode 64a is formed on a surface of the second substrate 64 on which the liquid crystal 66 is formed.

These electrodes 63a, 63b, and 64a may be formed, for example, by Indium Tin Oxide (ITO).

As the method of forming the electrodes, a vacuum evaporation method, a sputtering method, or a CVD (Chemical Vapor Deposition) method may be used, and the ITO film is over the entire surface of the substrates 63 and 64 by using the method.

After formation of the ITO film, the electrodes is formed in a desired shape by the photolithographic method.

Moreover, the center electrode 63a and the orbicular electrode 63b are electrically connected by extraction electrode (not shown in the figures).

Also, power source V is connected to the center electrode 63a and the common electrode 64a, and voltage is applied between the center electrode 63a and the common electrode 64a.

The waveform of the voltage applied by the power source V is a sinusoidal waveform (sine wave).

In the state when no voltage is applied between the center electrode 63a and the orbicular electrode 63b and the common electrode 64a by the power source V, the oriented state of the liquid crystal 66 has not changed. Therefore, the light which is incident onto the liquid crystal lens 62 goes straight into the liquid crystal 66.

If the voltage applied between the center electrode 63a and the orbicular electrode 63b and the common electrode 64a by the power source V is varied, the orientation of the liquid crystal 66 changes. Therefore, the diffraction angle of light emitted from the liquid crystal lens 62 changes.

As a result, the light condensing positions of the exposure beams LA and LB change with the variation in the voltage.

In this way, the incidence angles θA and θB of exposure beams LA and LB incident onto the base member 12 can be adjusted by the liquid crystal lens 62.

Next, using the manufacturing apparatus 60 of this embodiment configured as described above, the method for manufacturing the wavelength selective element 2 is described here.

Firstly, similar to the fifth embodiment, the base member 12 is moved using the moving mechanism 15 so that the opening 61a is positioned in the light selective region A, and the mask 61 is brought into contact with the exposure surface 12a of the base member 12.

Using the power source V, the laser light is emitted from the light source 10, the oriented state of the liquid crystal 66 is adjusted so that the angle θ formed by the exposure beam LA and the exposure beam LB becomes θ1, and the exposure beams LA and LB are led to be incident onto the base member 12 from the liquid crystal lens 62.

Next, similar to the fifth embodiment, using the power source V, the orientation of the liquid crystal 66 is adjusted so that the angle θ between the exposure beam LA and the exposure beam LB becomes θ2, θ3, θ4, and θ5, and the light selective regions B, C, D and, E are subjected to multiple exposure.

At this stage, the exposure beams LA and LB which are incident onto the liquid crystal lens 62 are diffracted toward the internal parts of the light selective regions A to E.

As a result, the exposure beams LA and LB are prevented from spreading to adjacent light selective regions A to E.

More specifically, when the light selective region A is subjected to multiple exposure, the exposure beams LA and LB can be prevented from spreading to the light selective region B.

According to the manufacturing apparatus 60 and the manufacturing method for manufacturing the wavelength selective element 2 related to this embodiment, by only controlling the voltage applied on the center electrode 63a, the orbicular electrode 63b and the common electrode 64a, the incidence angle of the exposure beams LA and LB incident onto the light selective regions A to E can be adjusted.

As a result, there is not need to provide an incidence angle adjusting section to rotate the reflecting mirror 13. Thus, the alignment between the exposure beams LA and LB, and the base member 12 becomes easy. Therefore, the man-hours required for production can be suppressed.

The mask 61 was brought into contact with the exposure surface 12a of the base member 12 and installed, but the liquid crystal leas 62 may be disposed on the light path of the exposure beam LB without bringing the mask into contact with the exposure surface 12a of the base member 12.

With this configuration, by fixing the incidence angle θA of the exposure beam LA incident onto the base member 12, and by controlling the voltage applied on the center electrode 63a, the orbicular electrode 63b and the common electrode 64a of the liquid crystal lens 62, only the incidence angle of the exposure beam LB incident onto the base member 12 can be changed.

Also, a mask arranged with a plurality of liquid crystal lenses may be used.

With this configuration, the radius of the center electrode 63a and the orbicular electrode 63b that constitute each liquid crystal lens can be varied according to the liquid crystal lens.

As a result, even if the voltage applied on any of the liquid crystal lens is the same, the diffraction angle of laser light emitted can be varied; thus, the voltage of the liquid crystal lens can be easily controlled.

Moreover, a liquid crystal leas 62 was used as the incidence angle adjusting section, but a spatial light modulator may also be used.

Ninth Embodiment

Figure 18:
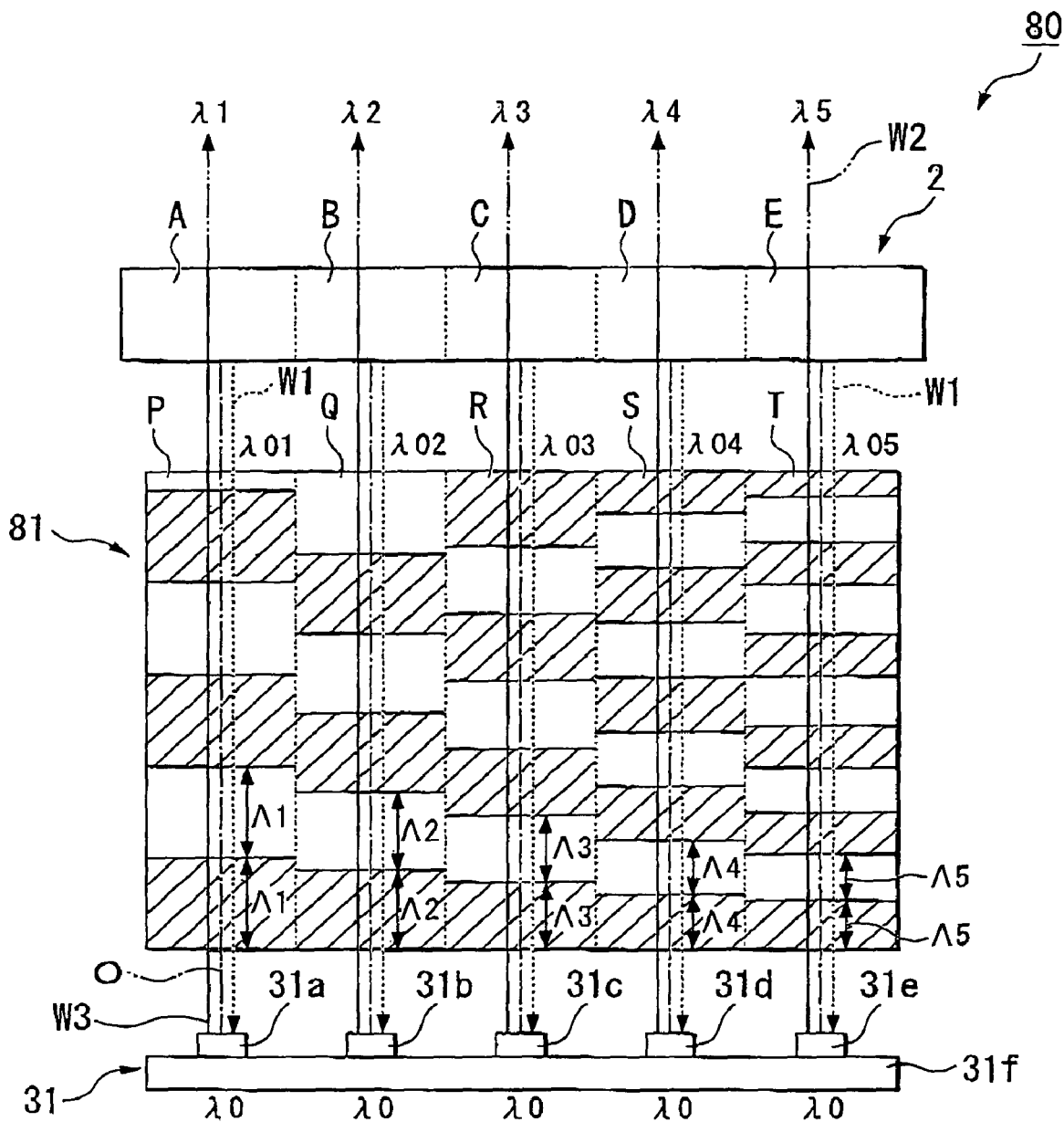
FIG. 18 is a cross-sectional view showing a light source device provided with a wavelength selective element manufactured by the manufacturing apparatus of the wavelength selective element related to the ninth embodiment of the invention.

Next, the ninth embodiment related to the invention is described here referring to FIG. 18.

In this embodiment, a light source device 80 provided with a wavelength conversion element 81 and the wavelength selective element 2 of the fifth embodiment mentioned above, are described here.

As shown in FIG. 18, the light source device 80 related to this embodiment, is provided with a light emission section 31, a wavelength conversion element 81 that converts the wavelength of light emitted from the light emission section 31, and a wavelength selective element 2 that selects the wavelength converted by the wavelength conversion element 81 and reflects it.

The light emission section 31 has a configuration in which five light emission elements 31a, 31b, 31c, 31d, and 31e are supported in a straight line in the support 31f.

The peak wavelengths of light λ0 emitted from the light emission element 31a to the light emission element 31e generally coincide.

However, there is no need for the wavelengths to coincide perfectly; a slight deviation is acceptable.

Usually, the peak wavelengths differ by a few nm depending on manufacturing error and so on, in the light emission element.

For example, the peak wavelength in case of a blue laser light source device emitting blue laser light is 920 nm; in case of a green laser light source device emitting green laser light is 1060 nm, and in case of a red laser light source device emitting red laser light is 1240 nm.

However, this wavelength is merely an example.

The wavelength conversion element (Second Harmonic Generation Element) 81 is a non-linear optical element that converts incident light to almost half the wavelength.

Light W3 emitted from the light emission section 31 and directed toward the wavelength selective element 2 is converted to almost half the wavelength of light by passing through the wavelength conversion element 81.

The wavelength conversion efficiency using the wavelength conversion element 81 has non-linear characteristics. For example, the stronger the intensity of laser light incident onto the wavelength conversion element 81, the higher is the conversion efficiency.

Also, the conversion efficiency of the wavelength conversion element 81 is approximately 40 to 50%.

That is, not all the laser light emitted from the light emission section 31 is converted to laser light of the predetermined wavelength.

A sheet-like shape may be used for the wavelength conversion element 81.

The wavelength conversion element 81 is divided into five regions P, Q, R, S, and T, corresponding to the plurality of light emission elements 31a to 31e.

That is, the regions through which the light emitted from the light emission elements 31a, 31b, 31c, 31d, and 31e pass through are taken as the regions P, Q, R, S, and T (through which light passes), respectively.

Also, the wavelength conversion element 81 has a polarized periodic structure for each of the regions from P to T. That is, it has a domain-repeating structure in which the polarization is mutually reversed.

When light passes through this polarized periodic structure, the wavelength of the incident light is converted.

The width in the direction of the central axis of laser light (hereafter referred to as "pitch") of each domain in the regions P, Q, R, S, and T of the wavelength conversion element 81 are Λ1, Λ2, Λ3, Λ4, and Λ5, respectively.

Each pitch from Λ1 to Λ5 is different.

Such a polarized periodic structure can be manufactured by using, for example, manufacturing method disclosed in the Japanese Unexamined Patent Application, First Publication No. H419719.

That is, firstly a striped electrode pattern with regions having and not having electrodes alternately arranged along the central axis 0 direction of the laser light is formed on a substrate made of non-linear ferroelectric material (for example, $LiTaO_3$).

At this stage, the width of each electrode pattern and the distance between these electrode patterns (streaks) are optimized so that the pitch of each domain in the regions P, Q, R, S, and T become Λ1, Λ2, Λ3, Λ4, and Λ5, respectively.

That is, the width and distance of the electrode patterns are considered to vary according to the regions P, Q, R, and S.

Next, a polarized periodic structure as shown in FIG. 18 can be obtained by applying pulse voltage on these electrode patterns.

In this way, after forming the polarized periodic structure, the usual electrode patterns are removed, but they may be retained as they are.

In this way, the wavelength conversion element 81 has a polarized inverse structure with varying period (pitch) in the regions P to T.

Accordingly, from the various wavelength components included in light of peak wavelength λ in the light passing through the regions P to T, each of the components of wavelengths λ01 to λ05, which vary slightly with respect to each other, are subjected to conversion, and converted to wavelengths λ1, λ2, λ3, λ4 and λ5 respectively, that vary slightly with respect to each other.

The wavelength selective element 2 selects only the laser light W1 not converted to the predetermined wavelengths λ1 to λ5 (that is, light of wavelengths λ01 to λ05) by the wavelength conversion element 81, reflects it toward the light emission section 31, and passes through laser light of other wavelengths.

The wavelength selective element 2 uses the wavelength selective element 2 manufactured by the manufacturing apparatus 1 of the fifth embodiment.

The light W1 (broken line shown in FIG. 18) reflected by the wavelength selective element 2 passes through the wavelength conversion element 81 again, and returns to the light emission elements 31*a* to 31*e*.

A part of the light returned to the light emission elements 31*a* to 31*e* is absorbed and converted to heat; however, most of the light is used as energy of emitted light. It is reflected in the light emission elements 31*a* to 31*e* and again emitted from the light emission elements 31*a* to 31*e*; thus, it is effectively utilized.

On the other hand, the light W2 (alternate long and two short dashes line shown in FIG. 18) passing through wavelength selective element 2 and converted to wavelengths λ1 to λ5 by the wavelength conversion element 81, passes through the wavelength selective element 2.

As described above, the light W3 emitted from the light emission section 31 is repeatedly reflected between the light emission section 31 and the wavelength selective element 2, and converted light W2 (alternate long and two short dashes line shown in FIG. 18) converted to predetermined wavelength is emitted from the wavelength selective element 2.

That is, although the wavelength selective element 2 has an action slightly different from that of the wavelength selective element 2 of the fifth embodiment, it has the function of the resonator mirror of the light emission elements 31*a* to 31*e*.

By changing the pitch of the domain in the region P to T of the light source device 80 related to this embodiment, by combining the wavelength conversion element 81 that enables conversion to differing wavelengths λ1 to λ5, with the wavelength selective element 2 provided with a plurality of light selective regions A to E with differing selective wavelengths, the wavelengths of light emitted from the wavelength selective element 2 can be mutually varied.

Consequently, the bandwidth of light emitted from the wavelength selective element 2 spreads compared to the case when the same light is emitted from all the regions; so the coherence of laser light reduces.

The result is that a light source device 80 with suppressed speckle noise can be obtained.

In this embodiment, a plurality of light emission elements 31*a* to 31*e* having peak wavelengths that were practically the same were used, but light emission elements with differing peak wavelengths may be proactively used.

That is, the wavelength selective element 2 may be manufactured by using peak wavelengths of λ01, λ02, λ03, λ04, λ05 in the light selective regions A to E, so that light of the same wavelengths as each of the peak wavelengths of the light emission elements 31*a* to 31*e* can be selected.

In this way, by coinciding the peak wavelength of each of the light emission elements 31*a* to 31*e* with the selective wavelengths in the light selective regions A to E of the wavelength selective element 2, the light utilization efficiency can be improved.

Tenth Embodiment

Figure 19:
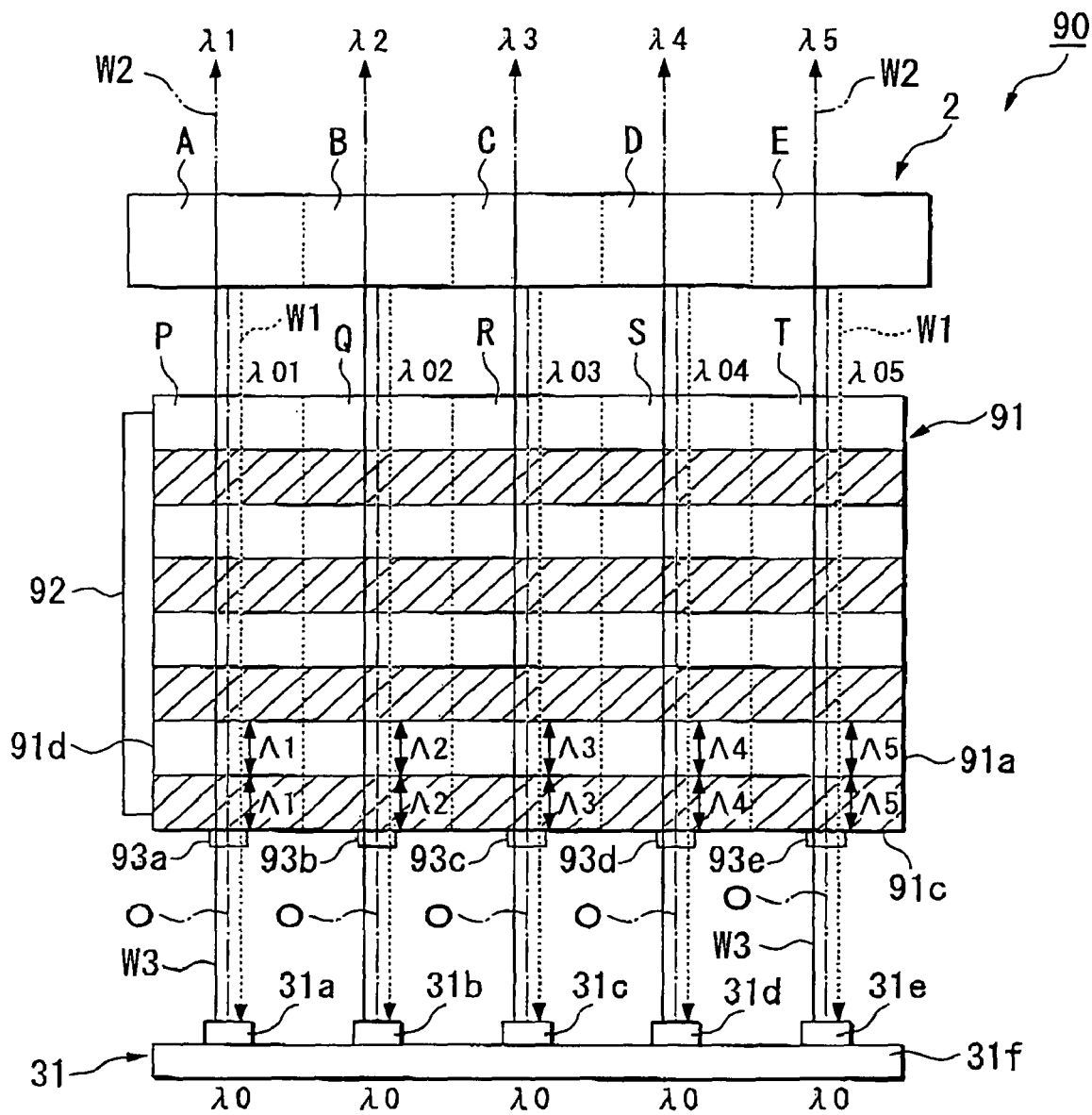
FIG. 19 is a cross-sectional view showing a light source device provided with a wavelength selective element manufactured by the manufacturing apparatus of the wavelength selective element related to the tenth embodiment of the invention.

Next, the tenth embodiment related to the invention is described here referring to FIG. 19.

The light source device 90 related to this embodiment differs from the ninth embodiment in that it is provided with a Peltier element 92.

All other aspects are similar to those in the ninth embodiment.

In the explanations of this embodiment, identical symbols are used for the elements which are identical to those of the light source device 80 of the ninth embodiment, and the explanations thereof are omitted.

Each pitch Λ1 to Λ5 of the domain of polarized periodic structure in the wavelength conversion element 81 of the ninth embodiment is different, and its value reduces gradually and sequentially. However, in the wavelength conversion element 91 of this embodiment, each pitch Λ1 to Λ5 remains practically the same when no action due to the Peltier element 92 described later is received.

In this way, even a wavelength conversion element 91 with equal domain pitch values for Λ1 to Λ5 can be manufactured according to the method described in the ninth embodiment.

The width and distance of electrode patterns used for applying pulse voltage in the production process described in the ninth embodiment may be kept the same in all the regions P, Q, R, S, and T.

The Peltier element 92 (temperature varying device) is bonded to the end face normal to the incident end face 91*c* on which light emitted from the light emission section 31 of the wavelength conversion element 91 is incident.

The Peltier element 92 is used so as to assign an appropriate temperature gradient to the wavelength conversion element 91.

The temperature gradient should be controlled so that light W3 emitted from the light emission elements 31*a* to 31*e* is converted to light of the desired wavelengths λ1 to λ5 in each of the regions P to T of the wavelength conversion element 91.

The Peltier element 92 is controlled so as to obtain an appropriate temperature gradient as above, and the wavelength conversion element 91 is heated and cooled.

The Peltier element 92 is controlled using the temperature sensors 93*a*, 93*b*, 93*c*, 93*d*, and 93*e* provided in each of the regions P to T of the incident end face 91*c* of the wavelength conversion element 91.

That is, the current flowing to the Peltier element 92 is controlled according to the temperature measured by the temperature sensor 93*a* to the temperature sensor 93*e*.

These temperature sensors 93*a* to 93*e* are provided at positions avoiding the paths of light W3 incident onto the wavelength conversion element 91 and the light W1 that returns from the wavelength conversion element 91, and are of configuration so that there are no effects on light W1 and light W3.

Here, the temperature gradient assigned by the Peltier element 92 is controlled so that the temperature reduces gradually on moving from the side of the end face 91*d* where the Peltier element 92 of the wavelength conversion element 91 is provided (side of region P) toward the side of the opposite end face 91*a* (side of the light selective region).

That is, a temperature gradient that gradually varies from high temperature to low temperature in a direction normal to the central axis 0 of the incident laser light is assigned to the wavelength conversion element 91.

The domain pitch changes due to thermal expansion with the change in the refractive index of the wavelength conversion element 91, according to this temperature gradient.

Accordingly, from the various wavelength components included in light of peak wavelength λ0 in the light passing through the regions P to T, each of the components of wavelength λ01 to λ05, which vary slightly with respect to each other, are affected by the change in the domain pitch or change in the refractive index, are subjected to conversion, and converted to wavelengths λ1 to λ5, respectively, which vary slightly with respect to each other.

Effects similar to the light source device of the ninth embodiment can be obtained even in the light source device 90 related to this embodiment.

The internal construction of the wavelength conversion element 91 is changed in the light source device 90 related to this embodiment by using the wavelength conversion element 91 with equal domain pitch Λ1 to Λ5, and assigning a temperature gradient with the Peltier element 92.

Accordingly, since there is no need for strict control of the pitch Λ1 to Λ5, the production cost of the wavelength conversion element 91 and as a consequence, the production cost of the light source device 90 can be reduced.

Eleventh Embodiment

Figure 20:
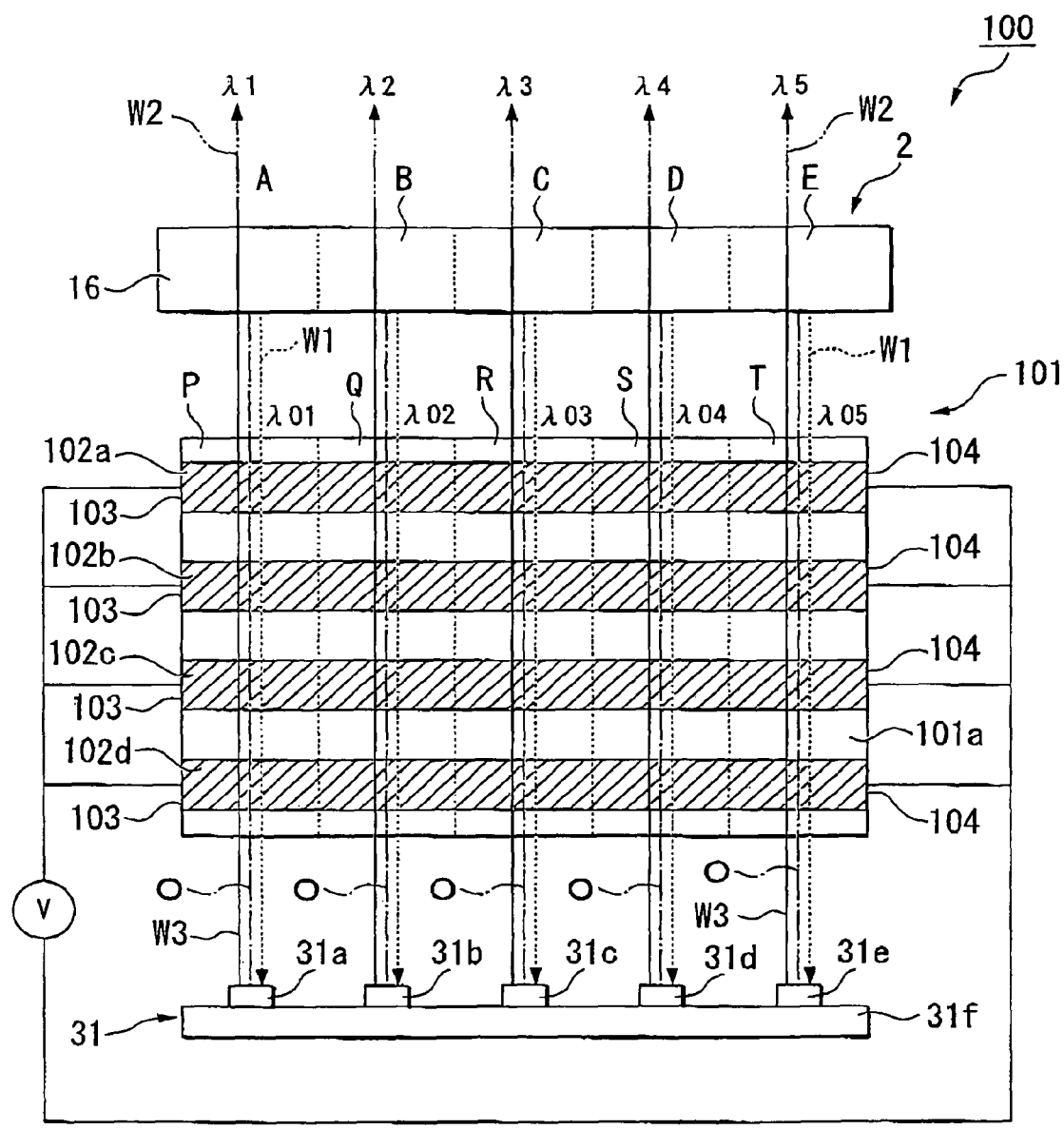
FIG. 20 is a cross-sectional view showing a light source device provided with a wavelength selective element manufactured by the manufacturing apparatus of the wavelength selective element related to the eleventh embodiment of the invention.

Next, the eleventh embodiment related to the invention is described here referring to FIG. 20.

The light source device 100 related to this embodiment differs from that in the ninth embodiment in that instead of the Peltier element 92, electrodes (voltage applying devices) 102a to 102d, including the regions P to T of the wavelength conversion element 101 are provided on the surface 101a.

All other aspects are similar to those in the ninth embodiment.

Instead of the regions P to T, sheet-shaped electrodes 102a, 102b, 102c, and 102d are provided on the surface 101a in the wavelength conversion element 101 of this embodiment.

Power source V is connected between the side of the end face 103 of these electrodes 102a to 102d, and the side of the opposite end face 104.

Moreover, the electrodes 102a to 102d are made of material with large resistance, such as Indium Tin Oxide (ITO) so as to increase the in-plane resistance.

As a result, voltage gradient occurs from the side of the end face 103 toward the side of the end face 104 when voltage is applied to the electrodes 102a to 102d.

Also, high voltage is applied on the side of end face 103 and low voltage is applied toward the side of the end face 104 in the electrodes 102a to 102d. Therefore, refractive index gradient occurs in the wavelength conversion element 101.

The refractive index gradient should be controlled so that light W3 emitted from the light emission elements 31a to 31e is converted to light of the desired wavelengths λ1 to λ5 in each of the regions P to T of the wavelength conversion element 101.

The power source V is controlled so that an appropriate refractive index gradient is obtained, and the voltage applied to the electrodes 102a to 102d is changed.

Effects similar to the light source device of the ninth embodiment can be obtained even in the light source device 100 related to this embodiment.

By applying voltage through the power source V on the electrodes 102a to 102d in the light source device 100 related to this embodiment, the internal structure of the wavelength conversion element 101 can be changed.

Accordingly, by using a more simple configuration, the light utilization efficiency of light which is emitted from a plurality of light emission elements 31a to 31e can be improved, and also a light source device with suppressed speckle noise can be obtained.

Twelfth Embodiment

Figure 21:
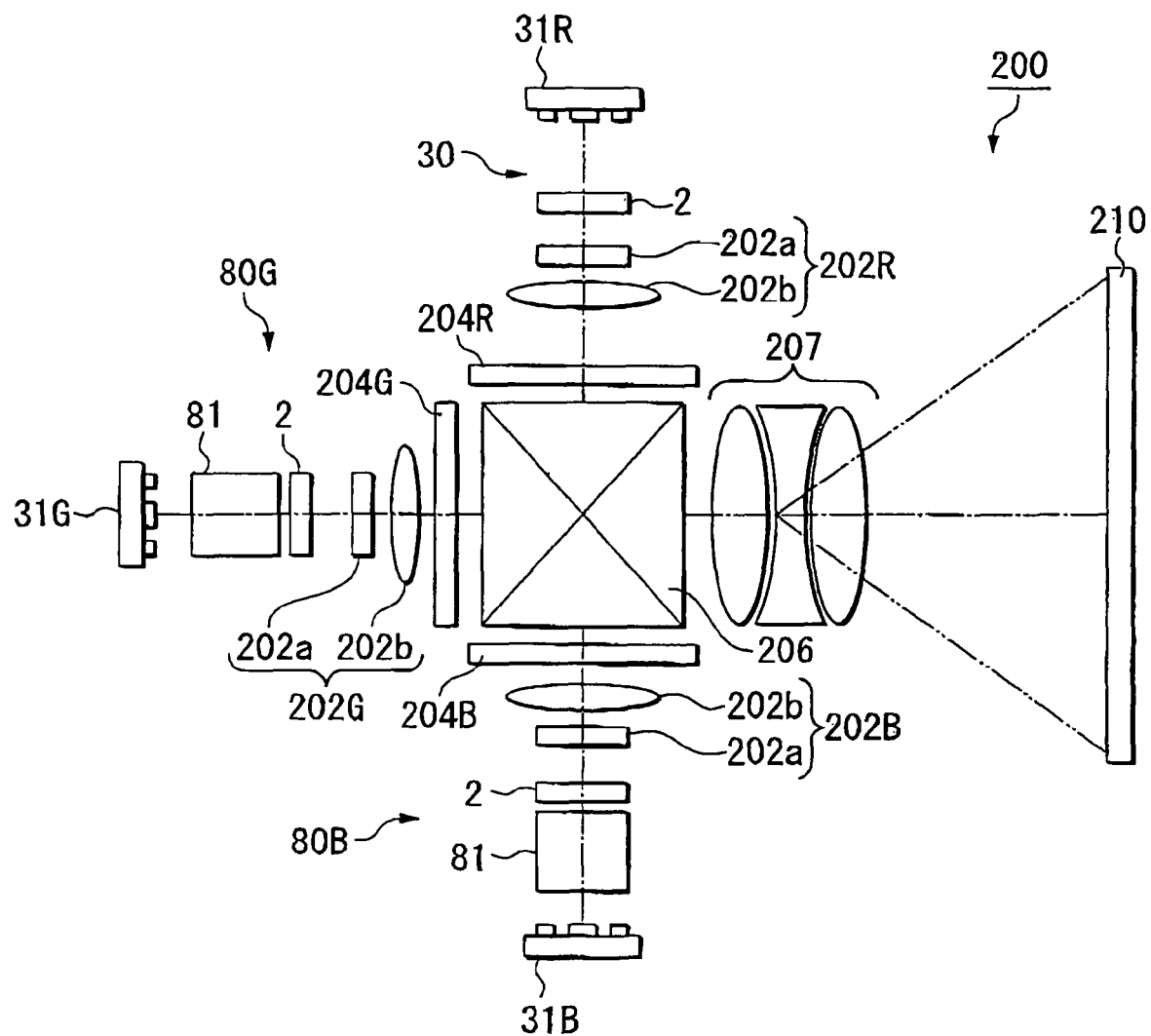
FIG. 21 is a schematic view showing an image display device related to the twelfth embodiment of the invention.

Next, the twelfth embodiment related to the invention is described here referring to FIG. 21.

In this embodiment, an image display device 200 provided with the light source device 30 of the fifth embodiment described above and the light source device 80 of the ninth embodiment described above is described here.

For simplification, the case constituting the image display device 200 is omitted in the FIG. 21.

The light source device 30 of the fifth embodiment described above is used as the red laser light source emitting red light, and the light source devices 80G and 80B of the ninth embodiment described above were used as the green laser light source and the blue laser light source emitting green light and blue light respectively, in the image display device 200.

The image display device 200 includes liquid crystal light valves 204R, 204G, and 204B (light modulating devices) that modulate laser light emitted from the laser light sources 31R, 31G, 31B; a cross dichroic prism 206 (colored light synthesizing device) that synthesizes light emitted from the liquid crystal light valves 204R, 204G, and 204B and leads it to a projection lens 207, and a projector lens (projection device) 207 that projects the image formed by the liquid crystal light valves 204R, 204G, and 204B on an enlarged screen 210.

Moreover, the image display device 200 uniformizes the luminance distribution of laser light emitted from the laser light sources 31R, 31G, and 31B. Therefore, uniformizing optical systems 2021, 202G, and 202B are provided more on the downstream side of the optical path than the laser light sources 31R, 31G, and 31B. As a result, the liquid crystal light valves 204R, 204G and 20413 are illuminated by light the luminance distribution of which has been uniformized.

For example, the uniformizing optical system 202R, 202G, and 202B may be constituted by a hologram 202a and a field lens 202b.

The three colored lights modulated by the liquid crystal light valves 204R, 204G, and 204B are projected on the cross dichroic prism 206.

This prism is formed by sticking together four rectangular prisms. A cross shape is disposed on its internal surface composed of a dielectric multilayer film that reflects red light and a dielectric multilayer film that reflects blue light.

Three colored lights are synthesized by these dielectric multilayer films, and light expressing colored image is formed.

The synthesized light is projected on the screen 210 by the projector lens 207, which is the projection optical system for the synthesized light, and an enlarged image is displayed.

In the image display device 200 of this embodiment mentioned above, the light emitted by the red laser light source 31R, the light emitted by the green laser light source 31G and the red laser light source 31B become light with reduced coherence. Thus, the light projected by the projector lens 207 is one with suppressed speckle noise.

Consequently, satisfactory image can be displayed on the screen 210.

The image display device of this embodiment was described as using a light source device 80 of the ninth embodiment for the green and blue laser light sources 31G and 31B, but light source devices of other embodiments may be used.

At this stage, light source devices of different embodiments may be used in each of the light source devices 30, 80G, and 80B, or optical devices of the same embodiment may also be used.

Also, transparent liquid crystal light valve was used as the light modulating device, but a light valve other than liquid crystal may be used. A reflective light valve may also be used.

Light valves that may be used include for example, reflective type liquid crystal light valve or digital micromirror device.

The configuration of projection optical system can be conveniently changed according to the type of light valve used.

The light source devices 30 to 100 of the fifth to eleventh embodiments may also be used in scanning type image display devices.

Figure 22:
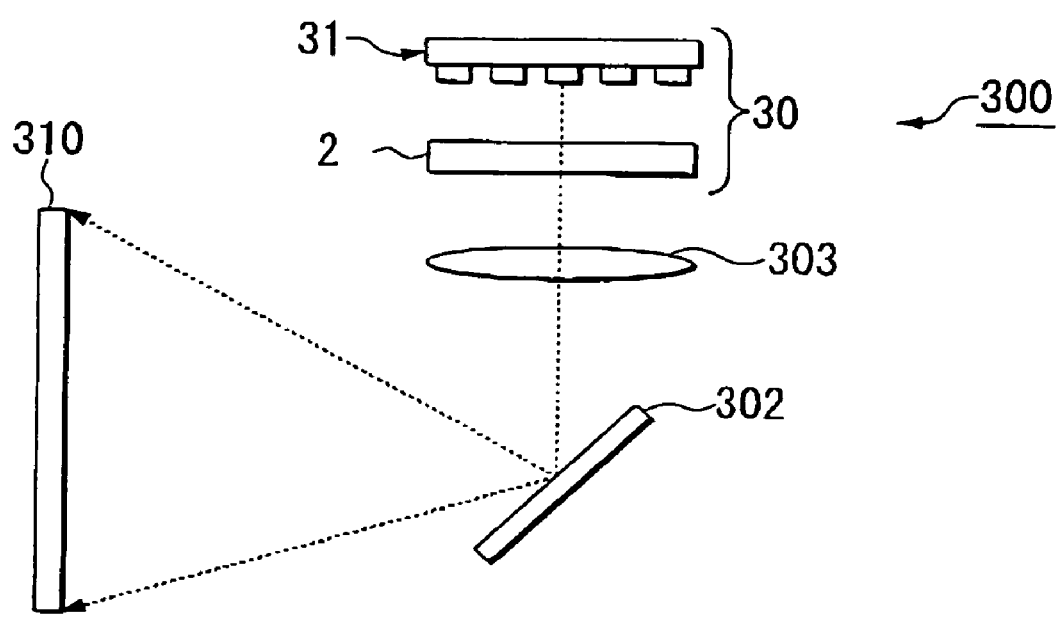
FIG. 22 is a schematic view showing an example of modification of the image display device of the invention.

FIG. 22 shows an example of this type of image display device.

The image display device 300 shown in FIG. 22 is provided with the light source device 30 of the fifth embodiment, a MEMS mirror (scanning device) 302 for scanning light emitted from the light source device 30 toward a screen 310, and a condenser lens 303 for condensing light emitted from the light source device 30 in the MEMS mirror 302.

The light emitted from the light source device 30 provided with wavelength selective element 2 of the fife embodiment is led by moving the MEMS more so that it scans in the horizontal and vertical direction on the screen 310.

To display colored images, the light emission section 31 may be composed of a plurality of light emission elements which are a combination of light emission elements having peak wavelengths of red, green and blue.

Thirteenth Embodiment

Next, a configuration example of a monitor 400 using the light source device 30 related to the fifth embodiment is described here.

Figure 23:
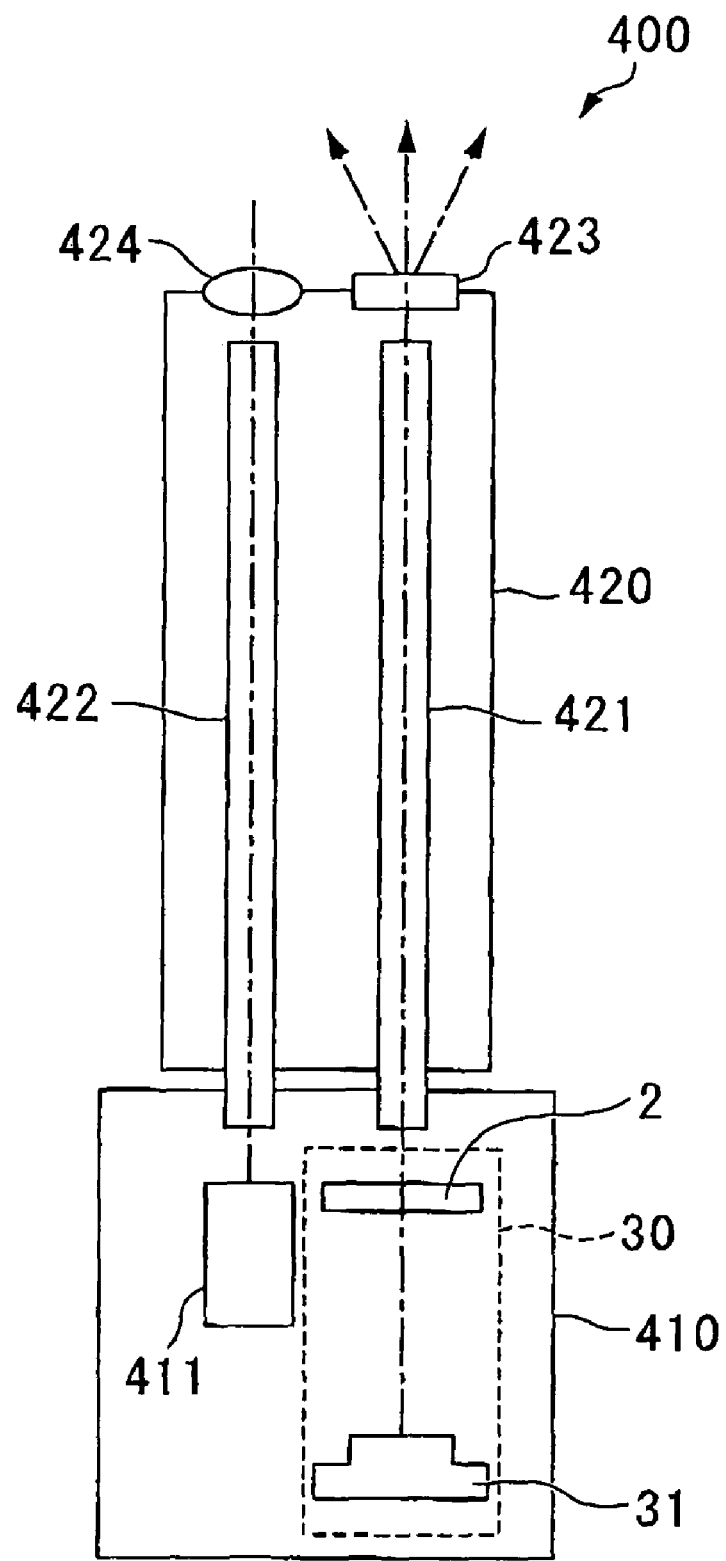
FIG. 23 is a schematic view showing a monitor related to the thirteenth embodiment of the invention.

FIG. 23 is a schematic drawing showing the concept of the monitor.

The monitor 400 is provided with a main unit 410 and a light transmitting unit 420.

The main unit 410 includes a light source device 30 having the wavelength selective element 2 of the fifth embodiment mentioned above.

The light transmitting unit 420 is provided with two light guides 421, 422 on the side sending light and on the side receiving light.

Each of the light guides 421, 422 is made of a bundle of multiple optical fibers and can send laser light over a long distance.

A light source device 30 is disposed on the incident side of the light guide 421 on the light transmitting side, and a diffusion plate 423 is disposed on its light emitting side.

The laser light emitted from the light source device 30 is sent along the light guide 421 to the diffusion plate 423 provided at the front end of the light transmitting unit 420, is diffused by the diffusion plate 423 and led to illuminate onto the object whose image is to be captured.

An image forming lens 424 is also provided at the front end of the light transmitting unit 420, and reflected light from the object whose image is to be captured can be received by the image forming lens 424.

The reflected light received is transmitted along the light guide 422 on the receiving side to the camera 411 used as an image capturing device provided in the main unit 410.

The result is that an image based on reflected light obtained by projecting the object whose image is to be captured by laser light emitted by the light source device 30 can be captured by the camera 411.

According to the monitor 400 configured as described above, light emitted from the light source device 30 with suppressed speckle noise can be led to illuminate onto an object whose image is to be captured. Thus, the clarity of the captured image obtained by the camera 411 can be improved.

In this embodiment, the light source device 30 includes a construction similar to that in the fifth embodiment was used, but instead, the light source device 80 of the ninth embodiment, the light source device 90 of the 10th embodiment or the light source 100 of the 11th embodiment may be used.

Note that the scope of the skill of the invention is not limited to the embodiment mentioned above, and various changes may be effected to the invention without departing from the spirit and scope of the invention.

For example all the selective wavelengths of each light selective region of the wavelength selective element were treated as different wavelengths, but the exposure beam may be adjusted so that the selective wavelength of at least one light selective regions (first light selective region) from the light selective regions may be different from the selective wavelength of the remaining light selective regions (second light selective region).

Also, one light emission element was made to correspond to one light selective region, but a plurality of light emission element may be made to correspond to one light selective region.

Moreover, the widths of a plurality of light selective regions were all made the same, but the invention is not restricted to this point; the distance or the like, of the light emission elements may be changed as needed.

What is claimed is:

1. A wavelength selective element comprising:
   a base member;
   light selective regions formed in the base member, in which a predetermined selective wavelength is selected from laser light emitted from a plurality of light emission elements that emit the laser light; and
   interference regions, each of which is provided in one of the light selective regions, each of which includes interference fringes, and including at least a first interference region and a second interference region in which a first distance between the interference fringes of the first interference region is different from a second distance between the interference fringes of the second interference region, and the interference regions including a region in which two adjacent interference regions overlap in a boundary portion of the interference regions in a longitudinal direction of the wavelength selective element,
   wherein the light emission elements are aligned with the interference regions in the longitudinal direction so that the laser light emitted from the light emission elements is incident onto the interference regions, respectively.

2. The wavelength selective element according to claim 1, wherein
   the shapes of the interference regions are identical.

3. The wavelength selective element according to claim 1, wherein
   the interference regions are arrayed in a two-dimensional arrangement.

4. The wavelength selective element according to claim 1, wherein a cross-sectional area of the interference regions in a direction perpendicular to the thickness direction of the base member increases gradually or step-by-step in the thickness direction.

5. A light source device, comprising:

a light source emitting light, and the wavelength selective element according to claim 1 selecting a predetermined wavelength from the light emitted from the light source and leading the light of the predetermined wavelength to pass therethrough.

6. An image display device comprising:

the light source device according to claim 5;

a light modulating device modulating the light emitted from the light source device in accordance with image signal; and a projection device projecting the image formed by the light modulating device.

7. A monitor, comprising:

the light source device according to claim 5; and an image capturing device capturing object image by using the light emitted from the light source device.

8. The wavelength selective element according to claim 1, wherein the region in which two adjacent interference regions overlap is a region that causes light selection efficiency to degrade when the laser light is incident onto the region.

* * * * *